(12) United States Patent
Gordon

(10) Patent No.: US 9,744,673 B1
(45) Date of Patent: *Aug. 29, 2017

(54) GRIPPER FOR MANIPULATING PLANAR WORKPIECE IN TIGHT-FITTING RECEPTACLE

(71) Applicant: Mark S. Gordon, McLean, VA (US)

(72) Inventor: Mark S. Gordon, McLean, VA (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/168,014

(22) Filed: May 28, 2016

Related U.S. Application Data

(63) Continuation-in-part of application No. 14/986,093, filed on Dec. 31, 2015, now Pat. No. 9,409,290.

(60) Provisional application No. 62/232,325, filed on Sep. 24, 2015.

(51) Int. Cl.
*B65G 9/00* (2006.01)
*B25J 15/00* (2006.01)
*B01D 46/42* (2006.01)

(52) U.S. Cl.
CPC ....... *B25J 15/0028* (2013.01); *B01D 46/4227* (2013.01)

(58) Field of Classification Search
CPC ...... B25J 1/04; B25J 15/0033; B25J 15/0028; B25J 1/02; A47J 43/283; A47G 21/10; Y10T 24/44385; Y10T 24/44427; Y10T 24/4447; B01D 46/4227
USPC .......... 294/173, 16, 106; 269/257, 258, 259, 269/279; 81/427
See application file for complete search history.

(56) References Cited

U.S. PATENT DOCUMENTS

| | | | | |
|---|---|---|---|---|
| 198,678 A | | 12/1877 | Poole | |
| 389,925 A | * | 9/1888 | Griscom | B66C 1/422 27/18 |
| 834,271 A | * | 10/1906 | Dale | B66C 1/422 294/118 |
| 856,681 A | | 6/1907 | Cederstrom | |
| 935,764 A | * | 10/1909 | Martin | E21B 19/10 188/67 |
| 1,104,470 A | | 7/1914 | Bilson | |
| 1,133,334 A | * | 3/1915 | Strycker | B25B 5/068 269/254 R |
| 1,356,785 A | | 10/1920 | Patterson | |
| 1,443,692 A | | 1/1923 | Lagorio | |
| 1,643,456 A | * | 9/1927 | James | A47G 21/10 294/2 |
| 1,811,730 A | * | 6/1931 | Newton | B66C 1/66 294/16 |

(Continued)

*Primary Examiner* — Gabriela Puig

(57) ABSTRACT

This apparatus supports gripping, manipulation and/or insertion or removal of a planar workpiece from a receptacle into which it fits tightly. The apparatus has two substantially identical rigid arms attached to one another at a single pivot point near their longitudinal center. One end of each arm forms a handle; pressing or releasing these two handles actuates the gripper. The other end of each arm has attached on its inside surface a rigid plate. Together these two substantially parallel plates form jaws to grip the planar workpiece. A spring attached to the two handles biases the jaws toward the closed position. An optional adjustable stop mechanism supports setting the gap between jaws when the apparatus is in the closed position. An alternative embodiment utilizes step-shaped jaws for applications where flat jaws are difficult to utilize.

6 Claims, 14 Drawing Sheets

(56) References Cited

U.S. PATENT DOCUMENTS

| | | | |
|---|---|---|---|
| 2,535,215 A | * 12/1950 | Klenk | A61M 3/00 |
| | | | 294/106 |
| 3,227,480 A | 1/1966 | Hinkle | |
| 3,558,169 A | * 1/1971 | Onanian | G11B 23/00 |
| | | | 294/33 |
| 4,002,365 A | * 1/1977 | Rader | A47J 43/283 |
| | | | 294/118 |
| 4,461,193 A | * 7/1984 | Gruber | B25B 7/18 |
| | | | 294/16 |
| 5,142,776 A | * 9/1992 | Neely | B25B 5/06 |
| | | | 24/509 |
| 5,901,993 A | 5/1999 | Lowery et al. | |
| 5,934,721 A | 8/1999 | Walde | |
| 8,746,768 B1 | 6/2014 | Coates | |

\* cited by examiner

GRIPPER FOR MANIPULATING PLANAR WORKPIECE IN TIGHT-FITTING RECEPTACLE

CROSS REFERENCES TO RELATED APPLICATIONS

This application is a continuation-in-part of application Ser. No. 14/986,093.

STATEMENT REGARDING FEDERALLY SPONSORED RESEARCH AND DEVELOPMENT

Not applicable to this application.

FIELD OF THE INVENTION

The present invention relates to a gripper for manipulating planar workpieces that reside temporarily during use in a tight-fitting slot or receptacle. This temporary aspect of planar workpiece use means that they must be installed, manipulated, and/or removed with some regularity.

BACKGROUND OF THE INVENTION

Planar workpieces whose effective operation requires that they be housed in a tight-fitting receptacle can be difficult to install in, manipulate in, or remove from such a receptacle. Various fields of endeavor utilize or can utilize such planar workpieces including but not limited to technology component or subsystem hardware, medicine, the residential and commercial building trades, and manufacturing or industrial machinery. These planar workpieces could include, for example, boards bearing electronic components, medical or surgical objects or components, filter elements, and machinery components or subsystems.

One such application of a planar workpiece in a tight receptacle is the filter utilized in a commercial or residential forced air heating, ventilating, and air conditioning (HVAC) system. In this case the filter is an example of a planar workpiece and the slot holding the filter is an example of a tight-fitting receptacle. These replaceable filters remove particulate objects from recirculated air during operation. These filters are removed, discarded or cleaned, and then replaced on a regular basis because they become clogged with particulate matter. Such a filter is installed in a slot or receptacle that by design: 1) has little or no space or gap between the filter and the slot, 2) is sized so that when the filter is fully installed the filter top is recessed below or level with the receptacle frame edge and the frame outer edges and filter outer edges overlap, 1) and 2) together helping to ensure that all recirculated air containing particles to be removed must pass through the filter and not around it through any gaps at the edges of the filter. This placement of the filter (planar workpiece) such that its top is recessed below or level with the receptacle frame edge represents the proper operational location for such a planar workpiece.

These filters are planar in shape, typically square or rectangular, and vary in size from a minimum of about 9 by 9 inches to over 25 by 25 inches. One commonly used type of HVAC filter is 1 inch thick. HVAC filters are often manufactured of cardboard or another semi-rigid material for a frame and of filtration materials including but not limited to fiberglass, paper, foam, polyester, cloth, etc.

While in use HVAC filters often become deformed due to the pressure of air passing through them. This deformation process may be hastened if a filter is not replaced after it becomes clogged.

The slot or receptacle that holds an HVAC filter is an integral part of an air handling system comprising ducts typically fabricated from sheet metal at the point holding the filter. These slots are typically installed manually by an HVAC technician during the HVAC system installation process. The result is variation in the precise width, depth and thickness of slots that are ostensibly the same size. In other words some slots designed for a 20×20×1 inch filter will be a tight fit along the edges for a filter of that size, others will be just right, while others will fit loosely. In addition, since the depth of the slot may vary, a filter may drop to the bottom of the filter slot and be below the outer edge of the air handling duct of which the slot is a part, making access for the purpose of filter removal difficult.

As a result, the installation and/or removal of HVAC filters can be difficult for one or more of the following reasons:
  a. The fit between filter and filter slot may be tight, making it difficult to push the filter into the slot on installation and pull the filter from the slot on removal.
  b. The outer edge of the filter may, when fully installed in the slot, be below the outer edge of the duct containing the filter slot, making it impossible to access the edges of the filter with human fingers during the removal process.
  c. The filter may have become deformed during use, making it impossible to access the edges of the filter with human fingers during the removal process and/or difficult to remove due to the deformation.
  d. The gap between the edges of the filter and the edges of the filter slot may be too small to permit human fingers or a tool such as pliers to grasp the filter during the removal process.
  e. The space above and/or around the filter slot through which a filter being installed or removed must pass may be difficult to access with human hands due to its location or may be partially obstructed by system components such as air ducts and/or gas or electrical lines.

The same difficulties discussed above for the HVAC filter example apply to other applications that utilize planar workpieces in tight-fitting slots.

SUMMARY OF THE INVENTION

The present invention relates to hand tools used for the insertion and/or removal of a planar workpiece from a slot or receptacle in which the planar workpiece fits tightly. A particular embodiment of the device is a tong-like or clamp-like apparatus with two arms pivoting at a single point near their longitudinal center, a comfortable, ergonomically-designed handle at one end of each of the arms, jaws for gripping the planar workpiece at the other end of the arms, a spring that biases the jaws toward the closed position, and an optional adjustment mechanism capable of setting the gap between the jaws.

The description herein, including the use of HVAC filter elements as an example, is solely for orientation and ease of understanding and neither this summary nor any of the terms or phraseology used herein should be construed as limiting. Additional features, advantages and embodiments of the present invention will be presented hereinafter and will form the basis for the claims appended hereto. It is to be understood that the present invention is not limited by the descriptions or drawings of embodiments presented hereinafter.

DRAWINGS—REFERENCE NUMERALS

Figure 1:
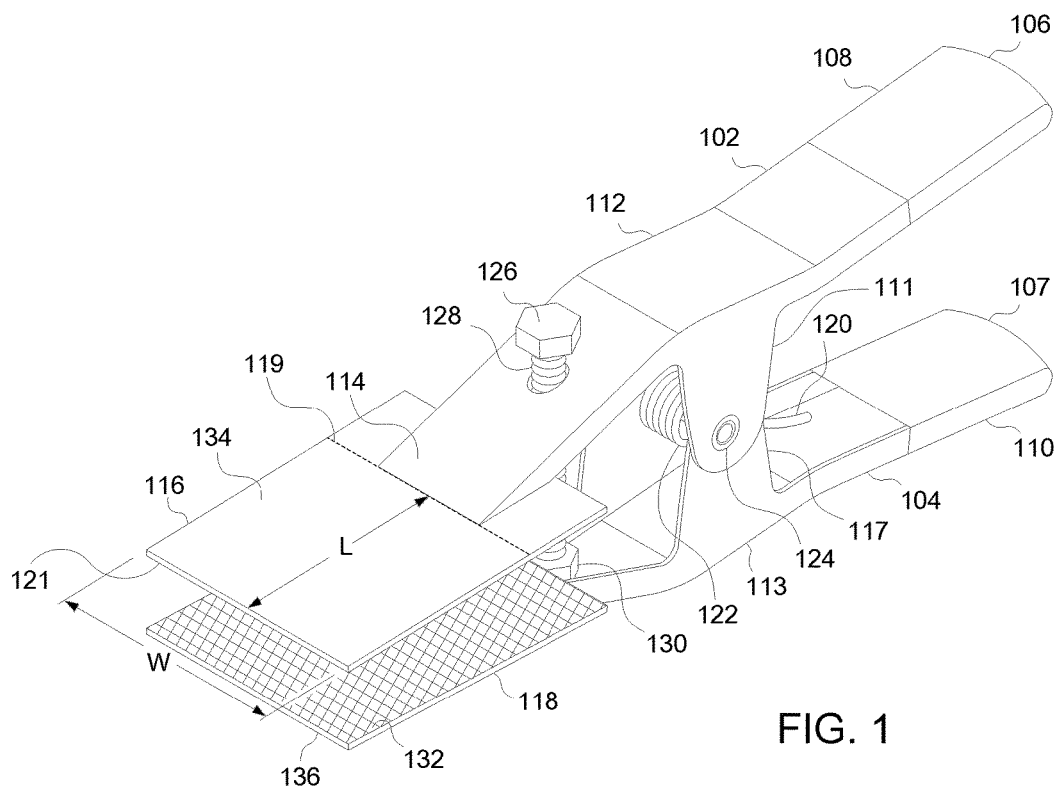
FIG. 1. is a top perspective view of one embodiment of the present invention.

| Drawing | Reference Numeral | Name |
|---|---|---|
| 1, 2, 3, 4, 6, 7, 8, 9, 10, 11, 12, 13, 14, 15, 16, 17 | 102 | first arm |
| 1, 2, 3, 5, 6, 7, 8, 9, 10, 11, 12, 13, 14, 15, 16, 17 | 104 | second arm |
| 1, 2, 3, 4, 6, 7, 8, 9, 10, 11, 12, 13, 14, 15, 16, 17 | 106 | first handle end |
| 1, 2, 3, 4. 5, 6, 7, 8, 9, 10, 11, 12, 13, 14, 15, 16, 17 | 107 | second handle end |
| 1, 2, 3, 4, 6, 7, 8, 9, 10, 11, 12, 13, 14, 15, 16, 17 | 108 | first handle |
| 1, 2, 3, 5, 6, 7, 8, 9, 10, 11, 12, 13, 14, 15, 16, 17 | 110 | second handle |
| 1, 2, 3, 6, 7, 8, 9, 10, 11, 12, 14, 15, 16, 17 | 111 | first linkage extension |
| 1, 2, 3, 4, 6, 7, 8, 9, 10, 11, 12, 13, 14, 15, 16, 17 | 112 | first middle portion |
| 1, 2, 3, 5, 6, 7, 8, 9, 10, 11, 12, 14, 15, 16,17 | 113 | second middle portion |
| 1, 3, 4, 6, 7, 9, 10, 12, 13, 14, 15, 17 | 114 | first jaw end |
| 2, 3, 5, 6, 9, 11, 12, 14, 17 | 115 | second jaw end |
| 1, 2, 3, 4, 6, 10, 11, 12, 13, 14 | 116 | first jaw |
| 1, 2, 3, 6, 7, 8, 9, 10, 11, 12, 14, 15, 16, 17 | 117 | second linkage extension |
| 1, 2, 3, 5, 6, 10, 11, 12, 14 | 118 | second jaw |
| 1, 4, 10, 13 | 119 | first jaw insertion limit line |
| 1, 2, 3, 6, 7, 8, 9, 10, 11, 12, 14, 15, 16, 17 | 120 | spring arm |
| 1, 2, 3, 10, 11, 12 | 121 | first jaw leading edge |
| 1, 2, 7, 8, 10, 11, 15, 16 | 122 | spring |
| 1, 2, 3, 6, 7, 8, 9, 10, 11, 12, 14, 15, 16, 17 | 124 | pivot pin |
| 1, 3, 4, 6, 7, 9 | 126 | jaw gap adjuster |
| 1, 7 | 128 | adjuster hole |
| 1, 3, 6, 7, 9 | 130 | second threaded sleeve |
| 1, 3, 6, 10, 12, 14 | 132 | second gripping surface |
| 1, 2, 3, 4, 5, 6, 10, 11, 12, 13, 14 | 134 | outer surface |
| 1, 2, 3, 10, 11, 12 | 136 | second jaw leading edge |
| 2, 3, 6, 8, 9 | 202 | first threaded sleeve |
| 2, 5, 11 | 204 | second jaw insertion limit line |
| 2, 3, 6, 11, 12, 14 | 206 | first gripping surface |
| 6, 9, 14, 17 | 602 | planar workpiece |
| 6, 9, 14, 17 | 604 | receptacle |
| 6, 9, 14, 17 | 606 | receptacle frame |
| 6, 9, 14, 17 | 608 | receptacle frame edge |
| 7, 8, 9, 15, 16, 17 | 702 | first offset jaw |
| 7, 9, 15, 17 | 704 | second offset jaw |
| 7, 8, 15, 16 | 706 | first offset jaw top step |
| 7, 8, 15, 16 | 708 | first offset jaw riser |
| 7,8, 15, 16 | 710 | first jaw |
| 7, 15 | 712 | first jaw insertion limit line |
| 7, 8, 15, 16 | 714 | second offset jaw top step |
| 7, 8, 15, 16 | 716 | second offset jaw riser |
| 7, 8, 15, 16 | 718 | second jaw |
| 7, 9, 15, 17 | 720 | second gripping surface |
| 7, 15 | 722 | second jaw leading edge |
| 8, 9, 16, 17 | 802 | first gripping surface |
| 8, 16 | 804 | first jaw leading edge |
| 8, 16 | 806 | second jaw insertion limit line |

DETAILED DESCRIPTION OF THE FIRST EMBODIMENT

A. Overview of the First Embodiment

As depicted in FIGS. 1 through 6, one embodiment of a gripper comprises a first arm 102 that extends from a first handle end 106 through a first handle 108 and a first middle portion 112 to a first jaw end 114. Attached to the first jaw end 114 is a first jaw 116. A second arm 104 extends from a second handle end 107 through a second handle 110 and a second middle portion 113 to a second jaw end 115. Attached to the second jaw end 115 is a second jaw 118. Protruding at approximately a right angle from the underside of the first middle portion 112 is a first linkage extension 111. Protruding at approximately a right angle from the underside of the second middle portion 113 is a second linkage extension 117. The first linkage extension 111 and the second linkage extension 117 partially overlap and are attached in this overlap area using a pivot pin 124 so that the first handle 108 and the second handle 110 can be actuated to vary the gap between the first jaw 116 and the second jaw 118, permitting the operator to grasp and manipulate a planar workpiece 602.

B. Detailed Description of the First Embodiment

Figure 3:
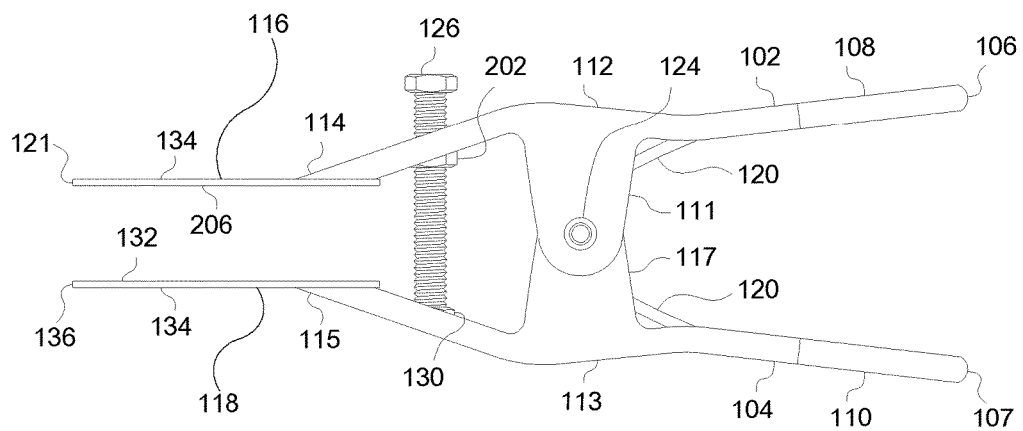
FIG. 3. is a side view of one embodiment of the present invention.
Figure 4:
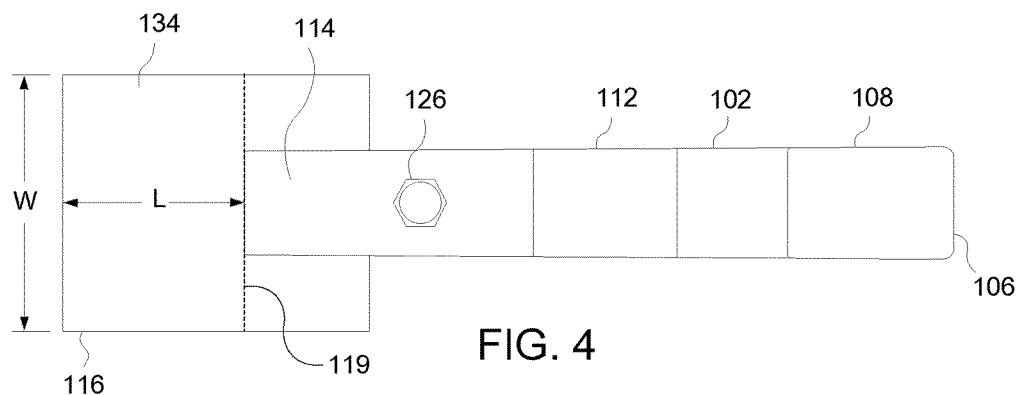
FIG. 4. is a top view of one embodiment of the present invention.
Figure 5:
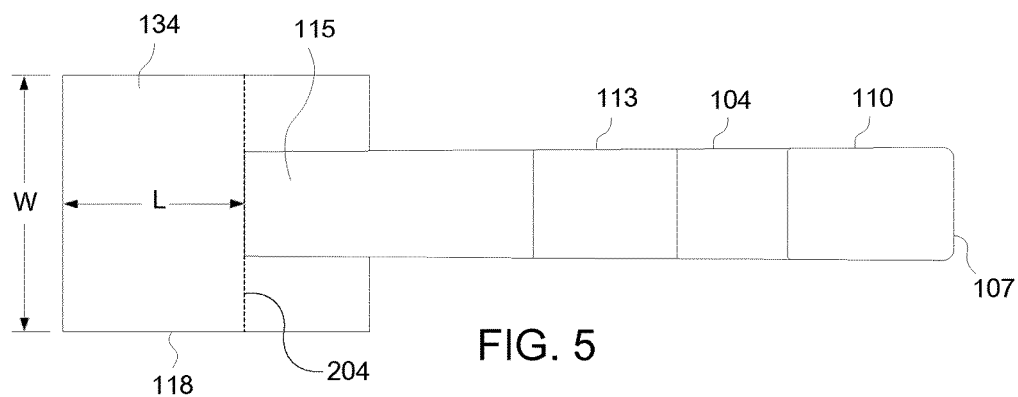
FIG. 5. is a bottom view of one embodiment of the present invention.

As shown in FIG. 1 and FIG. 3, a first arm 102 extends from a first handle end 106 through a first handle 108 and a first middle portion 112 to a first jaw end 114. Directly attached to the first jaw end 114 is a first jaw 116. Protruding at approximately a right angle from the underside of the first middle portion 112 is a first linkage extension 111.

As depicted in FIG. 1, the first jaw 116 extends parallel to the longitudinal axis of the first handle 108 from the first jaw end 114 in a direction opposite from the direction of the first arm 102 and laterally to either side of the first jaw end 114 so that the first jaw 116 forms a flat plate of uniform thickness. In this context the phrase "longitudinal axis of the first handle 108" refers to a straight line drawn from substantially the lateral center of the first handle end 106 to substantially the lateral center of the first middle portion 112, this line running parallel to the centerline of the first arm 102, and "uniform" means a thickness variation across the plate surface of no more than approximately 10%. The edge of the first jaw 116 farthest from the first jaw end 114 is the first jaw leading edge 121. The first jaw insertion limit line 119 is the endpoint for insertion of the first jaw 116 into the receptacle 604. For the first embodiment the first jaw insertion limit line 119 is the forward attachment point of the first jaw 116 to the first jaw end 114, "forward" meaning in a direction opposite to the first handle 108. The insertion distance into the receptacle 604 of the first jaw 116 is the distance from the first jaw leading edge 121 to the first jaw insertion limit line 119, this insertion distance being represented in FIG. 1 by the letter L.

Figure 2:
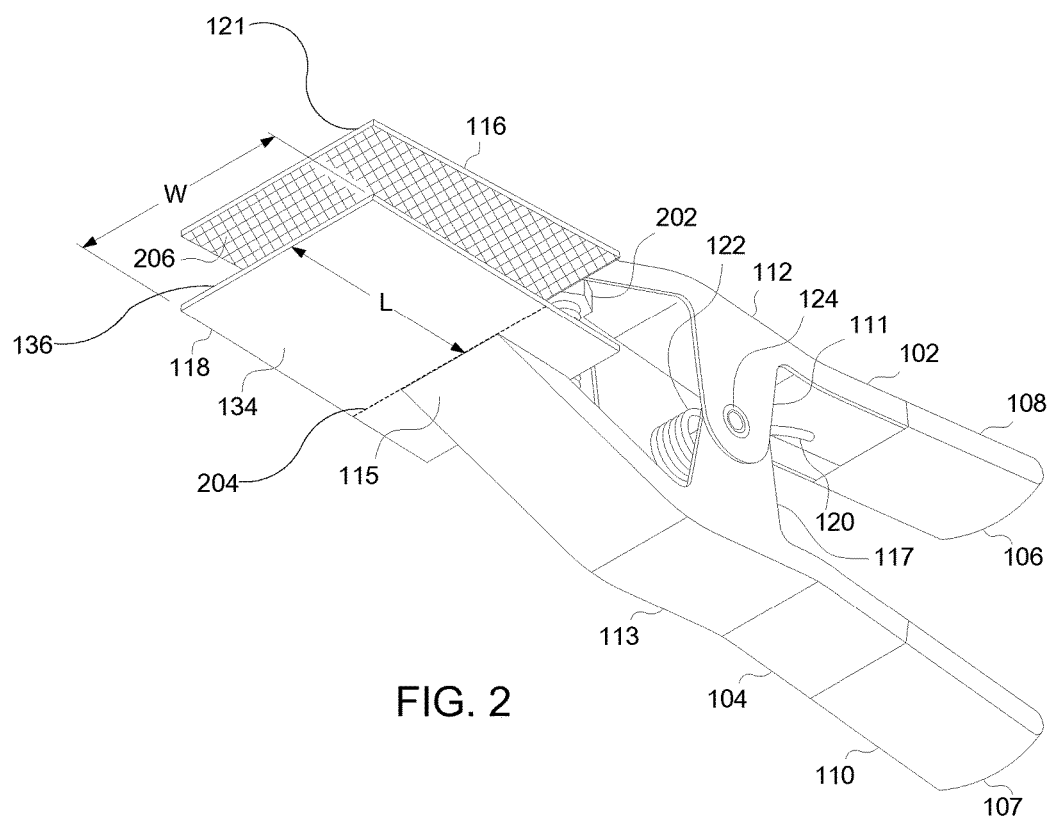
FIG. 2. is a bottom perspective view of one embodiment of the present invention.

As illustrated in FIG. 2 and FIG. 3, a second arm 104 extends from a second handle end 107 through a second handle 110 and a second middle portion 113 to a second jaw end 115. Directly attached to the second jaw end 115 is a second jaw 118. Protruding at approximately a right angle from the underside of the second middle portion 113 is a second linkage extension 117.

As depicted in FIG. 2, the second jaw 118 extends parallel to the longitudinal axis of the second handle 110 from the second jaw end 115 in a direction opposite from the direction of the second arm 104 and laterally to either side of the second jaw end 115 so that the second jaw 118 forms a flat plate of uniform thickness. In this context the phrase "longitudinal axis of the second handle 110" refers to a straight line drawn from substantially the lateral center of the second handle end 107 to substantially the lateral center of the second middle portion 113, this line running parallel to the centerline of the second arm 104, and "uniform" means a thickness variation across the plate surface of no more than approximately 10%. The edge of the second jaw 118 farthest from the second jaw end 115 is the second jaw leading edge 136. For the first embodiment the second jaw insertion limit line 204 is the forward attachment point of the second jaw 118 to the second jaw end 115, "forward" meaning in a direction opposite to the second handle 110. The insertion distance into the receptacle 604 of the second jaw 118 is the distance from the second jaw leading edge 136 to the second jaw insertion limit line 204, this insertion distance being represented in FIG. 2 by the letter L.

First and second arms 102, 104 may be formed of metal such as aluminum or steel, molded plastic, carbon fiber, or other materials. First and second arms 102, 104 length is sufficient to operate comfortably with one hand, for example in this embodiment approximately six inches. First and second handles 108, 110, as shown in FIGS. 1 through 3, may be ergonomically shaped. Other embodiments may use different materials of manufacture and/or different size and/or different shape configurations.

As depicted in FIGS. 1 through 3, and FIG. 6, the first linkage extension 111 and the second linkage extension 117 overlap and are attached in the overlap area by a pivot pin 124. Connecting the first arm 102 and the second arm 104 in this manner permits an operator of this embodiment to alter the gap between the first jaw 116 and the second jaw 118 by actuating the first handle 108 and the second handle 110 and thereby operate in a tong-like fashion this apparatus. Though the first arm 102 and the second arm 104 are shown as unitary structures of a particular shape in the referenced figures, they may be shaped differently in other embodiments and their representation herein should not be considered a limitation. Similarly, overlap and connection by the pivot pin 124 of the first linkage extension 111 and the second linkage extension 117 may be arranged differently in other embodiments and their presentation herein should not be considered a limitation.

As shown in FIG. 1 and FIG. 2, a spring 122 is mounted on the pivot pin 124. Integral to the spring 122 are two spring arms 120, which apply pressure to the first arm 102 and the second arm 104, thereby biasing the first jaw 116 and the second jaw 118 toward the closed position.

As depicted in FIG. 3, the first jaw 116 has an outer surface 134 and a first gripping surface 206, and the second jaw 118 has an outer surface 134 and a second gripping surface 132. The first jaw 116 and the second jaw 118 overlap one another and, in this embodiment, have coincident edges when viewed from a point six inches along an axis perpendicular to the plane of the first jaw 116 that extends outward from the first jaw 116 center point. The first jaw 116 and the second jaw 118 are substantially parallel to one another and, for the HVAC filter manipulation application discussed earlier, have an adjustable gap of approximately one inch between the first gripping surface 206 and the second gripping surface 132. Other embodiments for different applications may have different jaw dimensions, jaw overlap, and gripping surface gap.

As illustrated in FIGS. 1 through 3, a first threaded sleeve 202 (not visible in FIG. 1) is attached to the underside of the first arm 102 between the first middle portion 112 and the first jaw end 114. A second threaded sleeve 130 (not visible in FIG. 2) is attached to the underside of the second arm 104 between the second middle portion 113 and the second jaw end 115. A jaw gap adjuster 126 passes through an adjuster hole 128 (visible only in FIG. 1) and the first threaded sleeve 202 then enters second threaded sleeve 130. Turning the jaw gap adjuster 126 clockwise or counterclockwise provides a means for setting or varying the gap or space between the first gripping surface 206 and the second gripping surface 132, this adjustment mechanism being such that the gap or space remains constant when the gripper is at rest without pressure on the first handle 108 or on the second handle 110. The description presented here of a means for setting or varying the gap or space between the first gripping surface 206 and the second gripping surface 132 represents only one way to set this gap and this description should not to be considered a limitation; any mechanism known to one skilled in the art will suffice so long as the gap or space is maintained while the gripper is at rest.

The dimensions and material of manufacture for the first jaw 116 and the second jaw 118 can vary based on gripper application. For the application involving manipulation of HVAC filters discussed earlier, the width W of the first jaw 116, as shown in FIG. 1, may be two inches and the insertion distance L may be two inches or more. For the same HVAC filter manipulation application the width W of the second jaw 118, as shown in FIG. 2, may be two inches and the insertion distance L may be two inches or more. These first jaw 116 and second jaw 118 insertion distance and width dimensions will need to be substantially at least 1.25 inches to ensure sufficient gripping surface and depth of insertion into the receptacle 604, the term "substantially at least 1.25 inches" meaning no less than 1.125 inches. One possible first jaw 116 and second jaw 118 material of manufacture in this HVAC filter manipulation application is 16 gauge cold-rolled steel (0.0598 inches thick). For applications using cold-rolled steel jaws as a material of manufacture, an anti-corrosion coating such as, but not limited to, zinc or paint may be applied. Other embodiments for this HVAC filter or different applications may use stainless steel, plastic, carbon fiber or other materials for jaws.

The thickness of the first jaw 116 and the second jaw 118 material must be less than approximately 0.075 inches, meaning that the thickness cannot exceed 0.080 inches. This minimal jaw thickness permits use of the gripper when a planar workpiece 602 fits tightly or is stuck in its receptacle 604, "fits tightly", "stuck in", and "fit tightly" being defined as one or more of the following conditions: a) less than approximately 0.25 inches of space between an outer edge of the planar workpiece 602 and an outer edge of the receptacle 604 on one or both sides of the planar workpiece 602; b) a necessity to shake, oscillate, rock side-to-side or otherwise manipulate with force the planar workpiece 602 in order to free it from the receptacle 604 on removal or seat it fully into the receptacle 604 on insertion; c) insertion or removal requires damage or deformation of the planar workpiece 602, "damage or deformation" being defined as an increase or decrease of one or more dimensions of the planar workpiece 602—dimensions being length, width and thickness—of more than 5% of that dimension and/or the tearing, detachment or disassociation of planar workpiece 602 components such as, for example, planar workpiece 602 frame or border from other planar workpiece 602 material. Planar workpiece 602 as used herein refers to a mechanical object shaped as a rectangular cuboid.

A rigid material is required for the first jaw 116 and the second jaw 118, "rigid material" being defined as one that can maintain planarity across its surface to within a deflection from flatness of no more than one-eighth inch along the unsupported edge when a weight of ten pounds is applied to the unsupported edge of a 4 inch by 4 inch piece of this rigid material secured in a horizontal position such that a 2 by 4 inch dimension of this piece is cantilevered and thus unsupported. This measurement can be done by clamping to a flat-topped table one half of a 4 inch by 4 inch piece of the rigid material being tested so that the other half of the test material (a 2 inch by 4 inch section) is off the table top and thus unsupported. Then a ten pound weight is applied to the unsupported edge of the test material (farthest from the table edge) and the deflection of the weighted edge is measured with respect to the table edge.

C. Operation of the First Embodiment

Figure 6:
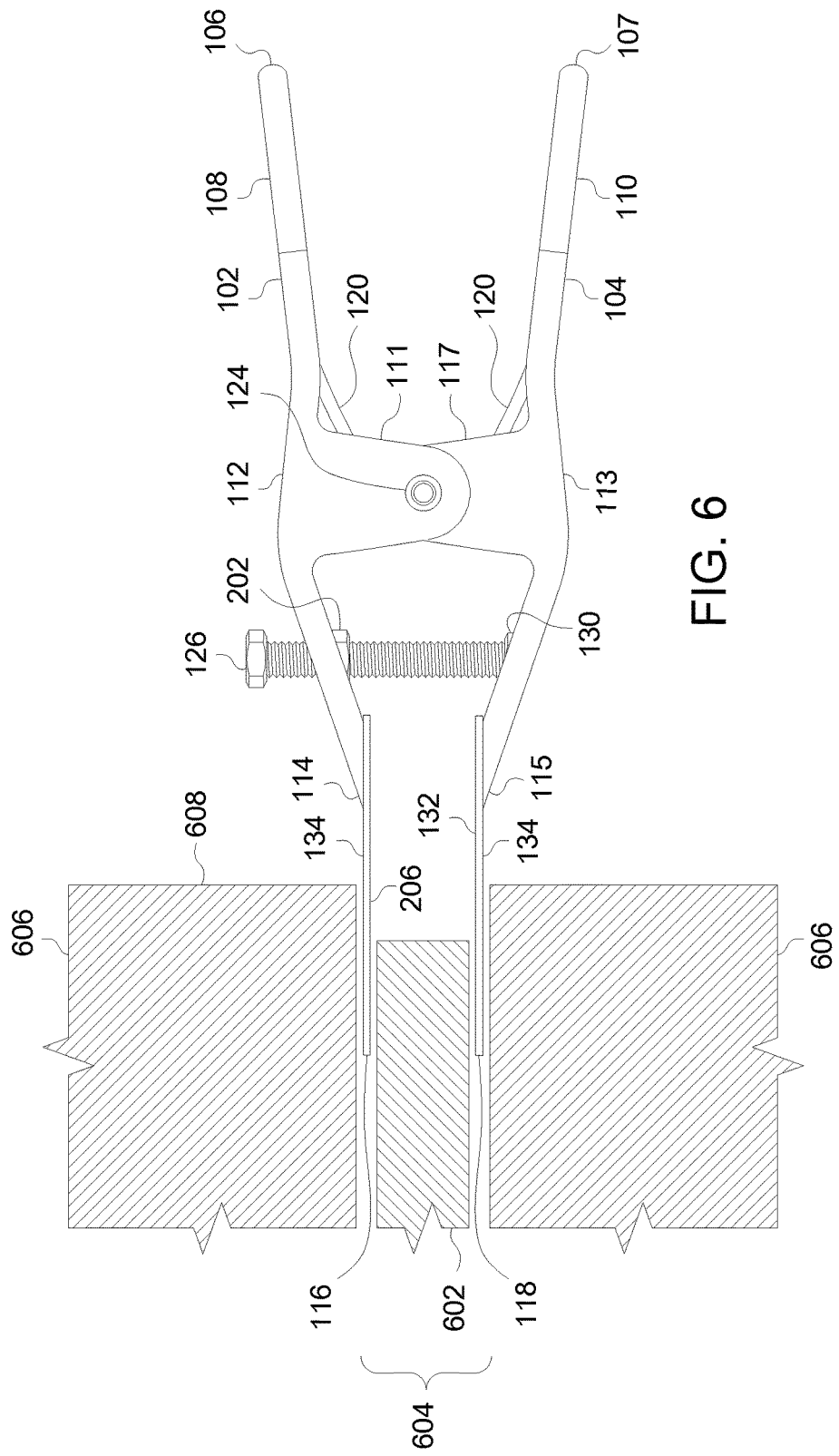
FIG. 6. is a side sectional view of one embodiment of the present invention in use.

FIG. 6 shows the gripper in operation. The operator first turns the jaw gap adjuster 126 until the gap between the first jaw 116 and the second jaw 118 is slightly less than the thickness of the planar workpiece 602 to be manipulated. In the case of planar workpiece 602 removal, the operator then squeezes the first handle 108 and the second handle 110 together to expand the gap between the first jaw 116 and the second jaw 118 until it equals the width of the receptacle 604. The operator then inserts the first jaw 116 and the second jaw 118 into the receptacle 604 so that first gripping surface 206 and the second gripping surface 132 overlap the planar workpiece 602, then the operator releases the first handle 108 and the second handle 110. The resulting tension applied by the spring 122 and the spring arms 120 presses together the first jaw 116 and the second jaw 118 until the stopping point set with the jaw gap adjuster 126. This pressing together of the first jaw 116 and the second jaw 118 causes gripping of the planar workpiece 602 by the first gripping surface 206 and the second gripping surface 132. Once gripped, the planar workpiece 602 can be manipulated as necessary to free its edges from a receptacle frame 606 present on either side of the planar workpiece 602 and then removed.

Planar workpiece 602 insertion is the opposite of removal. The operator first turns the jaw gap adjuster 126 until the gap between the first jaw 116 and the second jaw 118 is set to be slightly less than the thickness of the planar workpiece 602 to be manipulated. The operator then squeezes the first handle 108 and the second handle 110 together to expand the gap between the first jaw 116 and the second jaw 118 until it exceeds the width of the planar workpiece 602. The operator then slides the outer edge of the planar workpiece 602 between the first gripping surface 206 and the second gripping surface 132 and releases the first handle 108 and the second handle 110 so that the tension applied by the spring 122 and the spring arms 120 presses together the first jaw 116 and the second jaw 118 until the stopping point set with the jaw gap adjuster 126. The gripper now firmly holds the planar workpiece 602. The operator then inserts the planar workpiece 602 into the receptacle 604. Once partially inserted in the receptacle 604, the planar workpiece 602 can be manipulated as necessary to slide it fully into the receptacle 604. After full insertion of the planar workpiece 602 into the receptacle 604, the operator squeezes the first handle 108 and the second handle 110 together to expand the gap between the first jaw 116 and the second jaw 118 until it exceeds the width of the planar workpiece 602, then the operator withdraws the gripper from the receptacle 604.

In FIG. 6 the planar workpiece 602 is shown as recessed below a receptacle frame edge 608, which is a common occurrence either because the receptacle 604 is deeper than the planar workpiece 602 or because the planar workpiece 602 has become deformed during use. The planar workpiece 602 can be removed from the receptacle 604 in only one direction because the receptacle frame 606 is closed at the other end of the receptacle 604 (bottom of receptacle 604 is not shown in FIG. 6). This placement of the planar workpiece 602 recessed below (or level with) the receptacle frame edge 608 represents the proper operational location for such a planar workpiece 602.

The components depicted in FIG. 6 including but not limited to the receptacle 604, the receptacle frame 606, and the receptacle frame edge 608 are an example of a mechanical system whose operation requires insertion and removal of a planar workpiece 602 that resides in a receptacle 604 during normal operation. The representation of FIG. 6 is for reference only; other arrangements are possible that utilize a planar workpiece 602 whose insertion and removal may require a specialized tool such as the currently described gripper.

DETAILED DESCRIPTION OF AN ALTERNATIVE EMBODIMENT

A. Overview of an Alternative Embodiment

Figure 7:
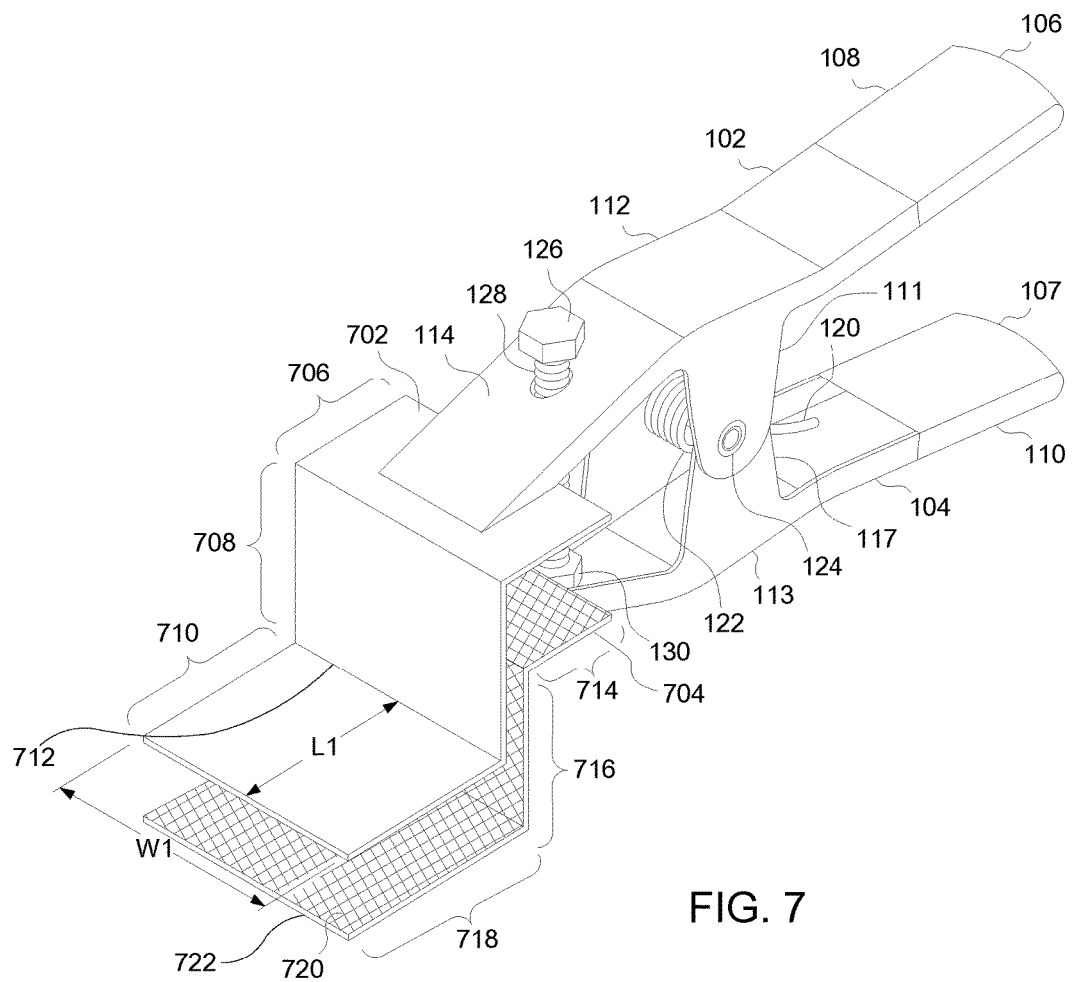
FIG. 7. is a top perspective view of another embodiment of the present invention.
Figure 8:
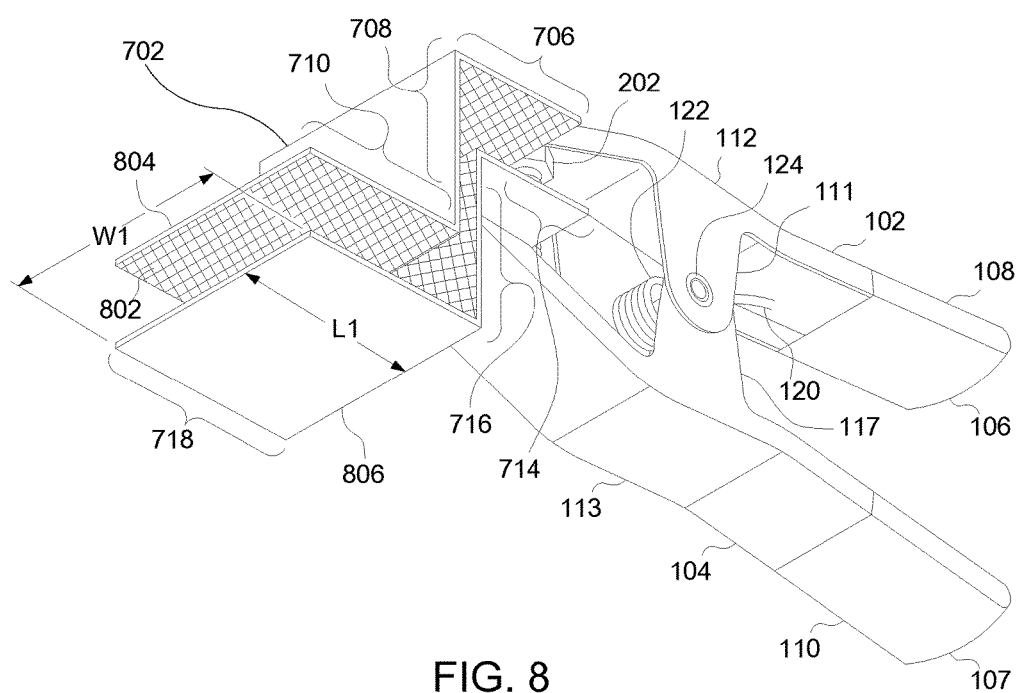
FIG. 8. is a bottom perspective view of another embodiment of the present invention.

A modification of the gripper embodiment depicted in FIGS. 1 through 5 is presented in FIGS. 7 and 8, wherein the gripper has a first offset jaw 702 and a second offset jaw 704 that are step-shaped rather than flat. In this alternative embodiment, the first offset jaw 702 adds a first offset jaw top step 706, and a first offset jaw riser 708, while the second offset jaw 704 of this alternative embodiment adds a second offset jaw top step 714, and a second offset jaw riser 716. In addition, for this alternative embodiment the numbering for certain elements changes as follows:

| Element Name | First Embodiment Numeral | Alternative Embodiment Numeral |
|---|---|---|
| first jaw | 116 | 710 |
| second jaw | 118 | 718 |
| first gripping surface | 206 | 802 |
| second gripping surface | 132 | 720 |
| first jaw insertion limit line | 119 | 712 |
| first jaw leading edge | 121 | 804 |
| second jaw insertion limit line | 204 | 806 |
| second jaw leading edge | 136 | 722 |

With the exception of these aforesaid jaw and gripping surface elements, the gripper first embodiment of FIGS. 1 through 5 and the gripper alternative embodiment of FIGS. 7 and 8 are identical. As such this section will describe only the step-shaped offset jaws of this alternative embodiment, their orientation, their attachment, and their operation, and the earlier description of all gripper components other than the jaws and gripping surfaces applies equally to this alternative embodiment.

B. Detailed Description of an Alternative Embodiment

As depicted in FIGS. 7 and 8, the first offset jaw 702 comprises three planar surfaces connected to form the equivalent of two horizontal and parallel but non-overlapping steps that are attached to one another by a connecting vertical riser. A first offset jaw top step 706 forms the first such planar surface. The longitudinal axis of the first offset jaw top step 706 is oriented parallel to the longitudinal axis of the gripper and is attached to the underside of the first jaw end 114. A first offset jaw riser 708 forms the second such planar surface. The first offset jaw riser 708 is attached to the edge of the first offset jaw top step 706 opposite the first jaw end 114 and is oriented at a right angle to the first offset jaw top step 706 so as to form a downward-oriented riser component in relation to the first offset jaw top step 706. A first jaw 710 forms the third such planar surface. The first jaw 710 is attached to the bottom edge of the first offset jaw riser 708 and extends parallel to the longitudinal axis of the first handle 108 from the first offset jaw riser 708 in a direction opposite from the direction of the first arm 102 and laterally to either side so that the first jaw 710 forms a flat plate of uniform thickness. In this context the phrase "longitudinal axis of the first handle 108" refers to a straight line drawn from substantially the lateral center of the first handle end 106 to substantially the lateral center of the first middle portion 112, this line running parallel to the centerline of the first arm 102, and "uniform" means a thickness variation across the plate surface of no more than approximately 10%. The edge of the first jaw 710 farthest from the first offset jaw riser 708 is the first jaw leading edge 804. The first jaw insertion limit line 712 is the endpoint for insertion of the first jaw 710 into the receptacle 604. For the alternative embodiment the first jaw insertion limit line 712 is the attachment point of the first jaw 710 to the first offset jaw riser 708. The insertion distance into the receptacle 604 of the first jaw 710 is the distance from the first jaw leading edge 804 (visible in FIG. 8 but not in FIG. 7) to the first jaw insertion limit line 712, this insertion distance being represented in FIG. 7 by the designation L1. A first gripping surface 802 (visible in FIG. 8 but not in FIG. 7) is located on the underside of the first jaw 710. The two steps and riser of the first offset jaw 702 may be a unitary structure.

Continuing with FIGS. 7 and 8, the second offset jaw 704 comprises three planar surfaces connected to form two horizontal and parallel but non-overlapping steps that are attached to one another by a connecting vertical riser to form a unitary structure. A second offset jaw top step 714 forms the first such planar surface. The longitudinal axis of the second offset jaw top step 714 is oriented parallel to the longitudinal axis of the gripper and is attached to the underside of the second jaw end 115. A second offset jaw riser 716 forms the second such planar surface. The second offset jaw riser 716 is attached to the edge of the second offset jaw top step 714 opposite the second jaw end 115 and is oriented at a right angle to the second offset jaw top step 714 so as to form a downward-oriented riser component in relation to the second offset jaw top step 714. A second jaw 718 forms the third such planar surface. The second jaw 718 is attached to the bottom edge of the second offset jaw riser 716 and extends parallel to the longitudinal axis of the second handle 110 from the second offset jaw riser 716 in a direction opposite from the direction of the second arm 104 and laterally to either side so that the second jaw 718 forms a flat plate of uniform thickness. In this context the phrase "longitudinal axis of the second handle 110" refers to a straight line drawn from substantially the lateral center of the second handle end 107 to substantially the lateral center of the second middle portion 113, this line running parallel to the centerline of the second arm 104, and "uniform" means a thickness variation across the plate surface of no more than approximately 10%. The edge of the second jaw 718 farthest from the second offset jaw riser 716 is the second jaw leading edge 722. The second jaw insertion limit line 806 is the endpoint for insertion of the second jaw 718 into the receptacle 604. For the alternative embodiment the second jaw insertion limit line 806 is the attachment point of the second jaw 718 to the second offset jaw riser 716. The insertion distance into the receptacle 604 of the second jaw 718 is the distance from the second jaw leading edge 722 (visible in FIG. 7 but not in FIG. 8) to the second jaw insertion limit line 806, this insertion distance being represented in FIG. 8 by the designation L1. A second gripping surface 720 (visible in FIG. 7 but not in FIG. 8) is located on the top side of the second jaw 718. The two steps and riser of the second offset jaw 704 may be a unitary structure.

As depicted in FIGS. 7 and 8, the first jaw 710 and the second jaw 718 overlap one another. The first offset jaw 702 has an outer surface 134 and a first gripping surface 802, and the second offset jaw 704 has an outer surface 134 and a second gripping surface 720. The first gripping surface 802 and the second gripping surface 720 face one another and, in this embodiment, have coincident edges when viewed from a point six inches along an axis perpendicular to the plane of the first gripping surface 802 that extends outward from the first jaw 710 center point. The first gripping surface 802 and the second gripping surface 720 are substantially parallel to one another and, for the HVAC filter manipulation application discussed earlier, have an adjustable gap of approximately one inch between the first gripping surface 802 and the second gripping surface 720. Other embodiments for different applications may have different jaw dimensions, jaw overlap, and gripping surface gap.

Figure 9:
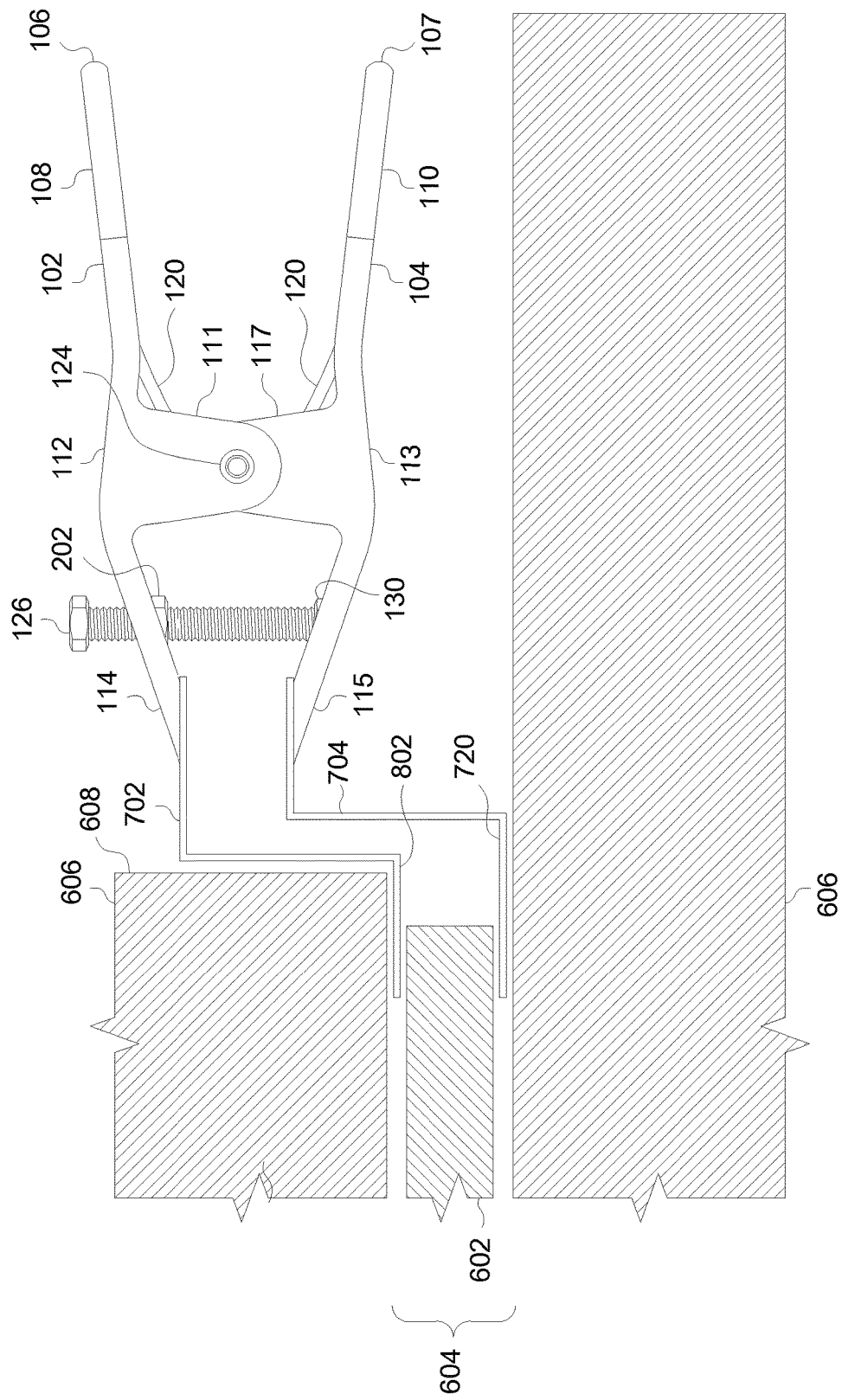
FIG. 9. is a side sectional view of another embodiment of the present invention in use.

As illustrated in FIGS. 7 and 9, a first threaded sleeve 202 (not visible in FIG. 7) is attached to the underside of the first arm 102 between the first middle portion 112 and the first jaw end 114. A second threaded sleeve 130 is attached to the underside of the second arm 104 between the second middle portion 113 and the second jaw end 115. A jaw gap adjuster 126 passes through an adjuster hole 128 (visible only in FIG. 7) and the first threaded sleeve 202 then enters second threaded sleeve 130. Turning the jaw gap adjuster 126 clockwise or counterclockwise provides a means for setting or varying the gap or space between the first gripping surface 802 and the second gripping surface 720, this adjustment mechanism being such that the gap or space remains constant when the gripper is at rest without pressure on the first handle 108 or second handle 110. The description presented here of a means for setting or varying the gap or space between the first gripping surface 802 and the second gripping surface 720 represents only one way to set this gap and this description should not to be considered a limitation; any mechanism known to one skilled in the art will suffice so long as the gap or space is maintained while the gripper is at rest.

The dimensions and material of manufacture for the first offset jaw 702 and the second offset jaw 704 can vary based on gripper application. For the application involving manipulation of HVAC filters discussed earlier, the width W1 of the first jaw 710, shown in FIGS. 7 and 8, may be two inches and the insertion distance L1 may be two inches or more. For the same HVAC filter manipulation application the width W1 of the second jaw 718, as illustrated in FIGS. 7 and 8, may be two inches and the insertion distance L1 may be two inches or more. These first jaw 710 and second jaw 718 insertion distance and width dimensions will need to be substantially at least 1.25 inches to ensure sufficient gripping surface and depth of insertion into the receptacle 604, the term "substantially at least 1.25 inches" meaning no less than 1.125 inches. One possible first offset jaw 702 and second offset jaw 704 material of manufacture in this HVAC filter manipulation application is 16 gauge cold-rolled steel (0.0598 inches thick). For applications using cold-rolled steel jaws as a material of manufacture, an anti-corrosion coating such as, but not limited to, zinc or paint may be applied. Other embodiments for this HVAC filter or different applications may use stainless steel, plastic, carbon fiber or other materials for jaws.

As illustrated in FIG. 9, this alternative embodiment of the gripper is used when the receptacle frame 606 on one side of the receptacle 604 extends in the direction of insertion and removal of the planar workpiece 602 such that insertion of the gripper with flat jaws (FIGS. 1 through 5) into the receptacle 604 is difficult or not possible.

Though the first offset jaw top step 706, the first offset jaw riser 708, and the first jaw 710 are shown as unitary structures in the referenced figures, they may be shaped or attached to one another and the first jaw end 114 differently in other embodiments and their representation herein should not be considered a limitation. Similarly, though second offset jaw top step 714, the second offset jaw riser 716, and the second jaw 718 are shown as unitary structures in the referenced figures, they may be shaped or attached to one another and the second jaw end 115 differently in other embodiments and their representation herein should not be considered a limitation.

The thickness of the first jaw 710 and the second jaw 718 material must be less than approximately 0.075 inches, meaning that the thickness cannot exceed 0.080 inches. This minimal jaw thickness permits use of the gripper when planar workpiece 602 fits tightly or is stuck in its receptacle 604, "fits tightly", "stuck in", and "fit tightly" being defined as one or more of the following conditions: a) less than approximately 0.25 inches of space between an outer edge of the planar workpiece 602 and an outer edge of the receptacle 604 on one or both sides of the planar workpiece 602; b) a necessity to shake, oscillate, rock side-to-side or otherwise manipulate with force the planar workpiece 602 in order to free it from the receptacle 604 on removal or seat it fully into the receptacle 604 on insertion; c) insertion or removal requires damage or deformation of the planar workpiece 602, "damage or deformation" being defined as an increase or decrease of one or more dimensions of the planar workpiece 602—dimensions being length, width and depth—of more than 5% of that dimension and/or the tearing, detachment or disassociation of planar workpiece 602 components such as, for example, planar workpiece 602 frame or border from other planar workpiece 602 material. Planar workpiece 602 as used herein refers to a mechanical object shaped as a rectangular cuboid.

A rigid material is required for the first jaw 710 and the second jaw 718, "rigid material" being defined as one that can maintain planarity across its surface to within a deflection from flatness of no more than one-eighth inch along the unsupported edge when a weight of ten pounds is applied to the unsupported edge of a 4 inch by 4 inch piece of this rigid material secured in a horizontal position such that a 2 by 4 inch dimension of this piece is cantilevered and thus unsupported. This measurement can be done by clamping to a flat-topped table one half of a 4 inch by 4 inch piece of the rigid material being tested so that the other half of the test material (a 2 inch by 4 inch section) is off the table top and thus unsupported. Then a ten pound weight is applied to the unsupported edge of the test material (farthest from the table edge) and the deflection of the weighted edge is measured with respect to the table edge.

C. Operation of an Alternative Embodiment

The alternative embodiment of the gripper presented in FIG. 9 operates similarly to the flat jaw gripper of FIGS. 1 through 5. The operator first turns the jaw gap adjuster 126 until the gap between the first offset jaw 702 and the second offset jaw 704 is slightly less than the thickness of the planar workpiece 602 to be manipulated. In the case of planar workpiece 602 removal, the operator then squeezes the first handle 108 and the second handle 110 together to expand the gap between the first jaw 710 and the second jaw 718 until it equals the width of the receptacle 604. The operator then inserts the first jaw 710 and the second jaw 718 into the receptacle 604 so that the first gripping surface 802 and the second gripping surface 720 overlap the planar workpiece 602, then the operator releases the first handle 108 and the second handle 110. The resulting tension applied by the spring 122 and the spring arms 120 presses together the first jaw 710 and the second jaw 718 until the stopping point set with the jaw gap adjuster 126. This pressing together of the first jaw 710 and the second jaw 718 causes gripping of the planar workpiece 602 by the first gripping surface 802 and the second gripping surface 720. Once gripped, the planar workpiece 602 can be manipulated as necessary to free its edges from a receptacle frame 606 present on either side of the planar workpiece 602 and then removed.

Planar workpiece 602 insertion using the offset jaw embodiment of the gripper as depicted in FIG. 9 is the opposite of removal. The operator first turns the jaw gap adjuster 126 until the gap between the first jaw 710 and the second jaw 718 is set to be slightly less than the thickness of the planar workpiece 602 to be manipulated. The operator then squeezes the first handle 108 and the second handle 110 together to expand the gap between the first jaw 710 and the second jaw 718 until it exceeds the width of the planar workpiece 602. The operator then slides the outer edge of the planar workpiece 602 between the first gripping surface 802 and the second gripping surface 720 and releases the first handle 108 and the second handle 110 so that the tension applied by the spring 122 and the spring arms 120 presses together the first jaw 710 and the second jaw 718 until the stopping point set with the jaw gap adjuster 126. The gripper now firmly holds the planar workpiece 602. The operator then inserts the planar workpiece 602 into the receptacle 604. Once partially inserted in the receptacle 604, the planar workpiece 602 can be manipulated as necessary to slide it fully into the receptacle 604. After full insertion of the planar workpiece 602 into the receptacle 604, the operator squeezes the first handle 108 and the second handle 110 together to expand the gap between the first jaw 710 and the second jaw 718 until it exceeds the width of the planar workpiece 602, then the operator withdraws the gripper from the receptacle 604 leaving the planar workpiece 602 in place.

In FIG. 9 the planar workpiece 602 is shown as recessed below a receptacle frame edge 608, which is a common occurrence either because the receptacle 604 is deeper than the planar workpiece 602 or because the planar workpiece 602 has become deformed during use. The planar workpiece 602 can be removed from the receptacle 604 in only one direction because the receptacle frame 606 is closed at the other end of the receptacle 604 (bottom of receptacle 604 is not shown in FIG. 9). This placement of the planar workpiece recessed below (or level with) the receptacle frame edge represents the proper operational location for such a planar workpiece.

The components depicted in FIG. 9 including but not limited to the receptacle 604, the receptacle frame 606, and the receptacle frame edge 608 are an example of a mechanical system whose operation requires insertion and removal of a planar workpiece 602 that resides in a receptacle 604 during normal operation. The representation of FIG. 9 is for reference only; other arrangements are possible that utilize a planar workpiece 602 whose insertion and removal may require a specialized tool such as the currently described gripper.

DETAILED DESCRIPTION OF FURTHER EMBODIMENTS

Further embodiments of the gripper described in this application are identical to the first embodiment and the alternative embodiment described earlier in this specification with the exception that these further embodiments do not have an adjustment mechanism capable of setting the gap between the jaws.

A. Overview of the First Further Embodiment

As depicted in FIGS. 10 through 14, a first further embodiment of a gripper comprises a first arm 102 that extends from a first handle end 106 through a first handle 108 and a first middle portion 112 to a first jaw end 114. Attached to the first jaw end 114 is a first jaw 116. A second arm 104 extends from a second handle end 107 through a second handle 110 and a second middle portion 113 to a second jaw end 115. Attached to the second jaw end 115 is a second jaw 118. Protruding at approximately a right angle from the underside of the first middle portion 112 is a first linkage extension 111. Protruding at approximately a right angle from the underside of the second middle portion 113 is a second linkage extension 117. The first linkage extension 111 and the second linkage extension 117 partially overlap and are attached in this overlap area using a pivot pin 124 so that the first handle 108 and the second handle 110 can be actuated to vary the gap between the first jaw 116 and the second jaw 118, permitting the operator to grasp and manipulate a planar workpiece 602.

B. Detailed Description of the First Further Embodiment

Figure 10:
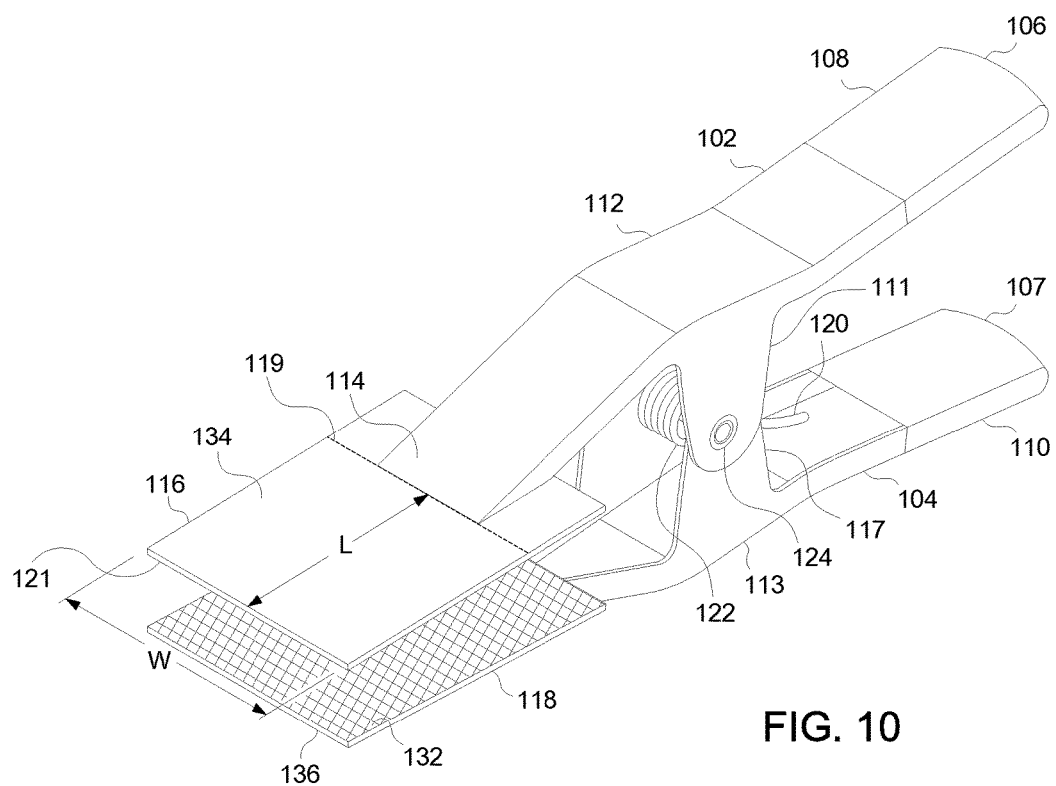
FIG. 10. is a top perspective view of a further embodiment of the present invention.
Figure 12:
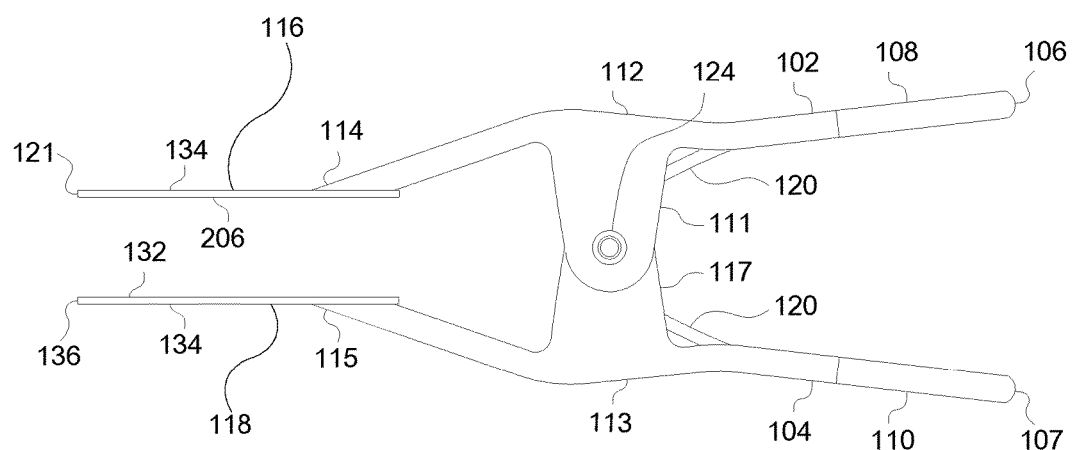
FIG. 12. is a side view of a further embodiment of the present invention.
Figure 13:
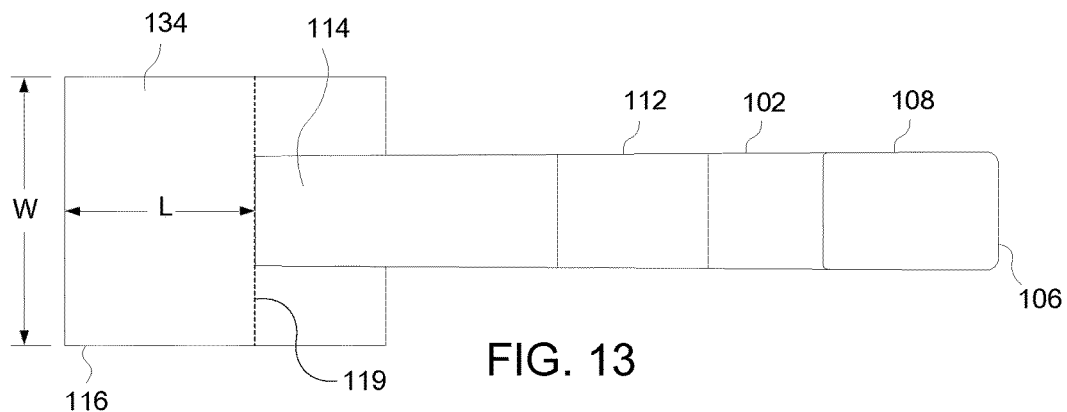
FIG. 13. is a top view of a further embodiment of the present invention.

As shown in FIG. 10 and FIG. 12, a first arm 102 extends from a first handle end 106 through a first handle 108 and a first middle portion 112 to a first jaw end 114. Directly attached to the first jaw end 114 is a first jaw 116. Protruding at approximately a right angle from the underside of the first middle portion 112 is a first linkage extension 111.

As depicted in FIG. 10, the first jaw 116 extends parallel to the longitudinal axis of the first handle 108 from the first jaw end 114 in a direction opposite from the direction of the first arm 102 and laterally to either side of the first jaw end 114 so that the first jaw 116 forms a flat plate of uniform thickness. In this context the phrase "longitudinal axis of the first handle 108" refers to a straight line drawn from substantially the lateral center of the first handle end 106 to substantially the lateral center of the first middle portion 112, this line running parallel to the centerline of the first arm 102, and "uniform" means a thickness variation across the plate surface of no more than approximately 10%. The edge of the first jaw 116 farthest from the first jaw end 114 is the first jaw leading edge 121. The first jaw insertion limit line 119 is the endpoint for insertion of the first jaw 116 into the receptacle 604. For the first further embodiment the first jaw insertion limit line 119 is the forward attachment point of the first jaw 116 to the first jaw end 114, "forward" meaning in a direction opposite to the first handle 108. The insertion distance into the receptacle 604 of the first jaw 116 is the distance from the first jaw leading edge 121 to the first jaw insertion limit line 119, this insertion distance being represented in FIG. 10 by the letter L.

Figure 11:
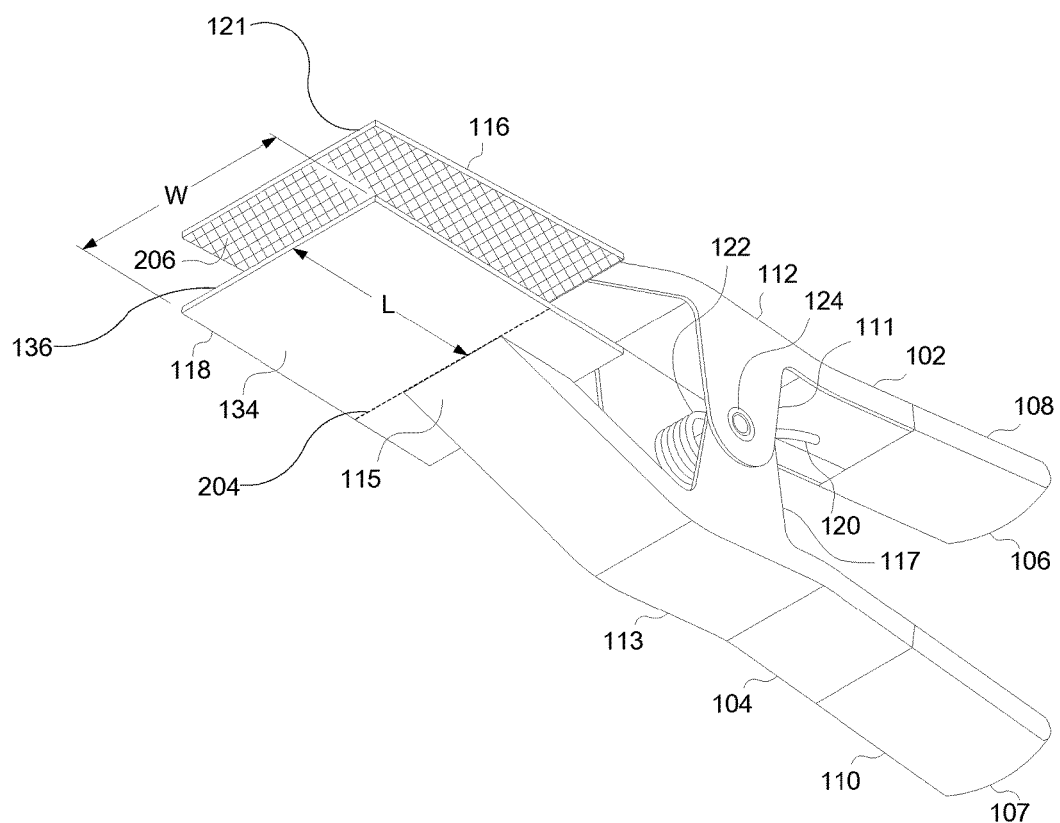
FIG. 11. is a bottom perspective view of a further embodiment of the present invention.

As illustrated in FIG. 11 and FIG. 12, a second arm 104 extends from a second handle end 107 through a second handle 110 and a second middle portion 113 to a second jaw end 115. Directly attached to the second jaw end 115 is a second jaw 118. Protruding at approximately a right angle from the underside of the second middle portion 113 is a second linkage extension 117.

As depicted in FIG. 11, the second jaw 118 extends parallel to the longitudinal axis of the second handle 110 from the second jaw end 115 in a direction opposite from the direction of the second arm 104 and laterally to either side of the second jaw end 115 so that the second jaw 118 forms a flat plate of uniform thickness. In this context the phrase "longitudinal axis of the second handle 110" refers to a straight line drawn from substantially the lateral center of the second handle end 107 to substantially the lateral center of the second middle portion 113, this line running parallel to the centerline of the second arm 104, and "uniform" means a thickness variation across the plate surface of no more than approximately 10%. The edge of the second jaw 118 farthest from the second jaw end 115 is the second jaw leading edge 136. For the first further embodiment the second jaw insertion limit line 204 is the forward attachment point of the second jaw 118 to the second jaw end 115, "forward" meaning in a direction opposite to the second handle 110. The insertion distance into the receptacle 604 of the second jaw 118 is the distance from the second jaw leading edge 136 to the second jaw insertion limit line 204, this insertion distance being represented in FIG. 11 by the letter L.

First and second arms 102, 104 may be formed of metal such as aluminum or steel, molded plastic, carbon fiber, or other materials. First and second arms 102, 104 length is sufficient to operate comfortably with one hand, for example in this embodiment approximately six inches. First and second handles 108, 110, as shown in FIGS. 10 through 12, may be ergonomically shaped. Other embodiments may use different materials of manufacture and/or different size and/or different shape configurations.

As depicted in FIGS. 10 through 12, and FIG. 14, the first linkage extension 111 and the second linkage extension 117 overlap and are attached in the overlap area by a pivot pin 124. Connecting the first arm 102 and the second arm 104 in this manner permits an operator of this embodiment to alter the gap between the first jaw 116 and the second jaw 118 by actuating the first handle 108 and the second handle 110 and thereby operate in a tong-like fashion this apparatus. Though the first arm 102 and the second arm 104 are shown as unitary structures of a particular shape in the referenced figures, they may be shaped differently in other embodiments and their representation herein should not be considered a limitation. Similarly, overlap and connection by the pivot pin 124 of the first linkage extension 111 and the second linkage extension 117 may be arranged differently in other embodiments and their presentation herein should not be considered a limitation.

As shown in FIG. 10 and FIG. 11, a spring 122 is mounted on the pivot pin 124. Integral to the spring 122 are two spring arms 120, which apply pressure to the first arm 102 and the second arm 104, thereby biasing the first jaw 116 and the second jaw 118 toward the closed position.

As depicted in FIG. 12, the first jaw 116 has an outer surface 134 and a first gripping surface 206, and the second jaw 118 has an outer surface 134 and a second gripping surface 132. The first jaw 116 and the second jaw 118 overlap one another and, in this embodiment, have coincident edges when viewed from a point six inches along an axis perpendicular to the plane of the first jaw 116 that extends outward from the first jaw 116 center point. The first jaw 116 and the second jaw 118 are substantially parallel to one another and, for the HVAC filter manipulation application discussed earlier, have an adjustable gap of approximately one inch between the first gripping surface 206 and the second gripping surface 132. Other embodiments for different applications may have different jaw dimensions, jaw overlap, and gripping surface gap.

The dimensions and material of manufacture for the first jaw 116 and the second jaw 118 can vary based on gripper application. For the application involving manipulation of HVAC filters discussed earlier, the width W of the first jaw 116, as shown in FIG. 10, may be two inches and the insertion distance L may be two inches or more. For the same HVAC filter manipulation application the width W of the second jaw 118, as shown in FIG. 11, may be two inches and the insertion distance L may be two inches or more. These first jaw 116 and second jaw 118 insertion distance and width dimensions will need to be substantially at least 1.25 inches to ensure sufficient gripping surface and depth of insertion into the receptacle 604, the term "substantially at least 1.25 inches" meaning no less than 1.125 inches. One possible first jaw 116 and second jaw 118 material of manufacture in this HVAC filter manipulation application is 16 gauge cold-rolled steel (0.0598 inches thick). For applications using cold-rolled steel jaws as a material of manufacture, an anti-corrosion coating such as, but not limited to, zinc or paint may be applied. Other embodiments for this HVAC filter or different applications may use stainless steel, plastic, carbon fiber or other materials for jaws.

The thickness of the first jaw 116 and the second jaw 118 material must be less than approximately 0.075 inches, meaning that the thickness cannot exceed 0.080 inches. This minimal jaw thickness permits use of the gripper when a planar workpiece 602 fits tightly or is stuck in its receptacle 604, "fits tightly", "stuck in", and "fit tightly" being defined as one or more of the following conditions: a) less than approximately 0.25 inches of space between an outer edge of the planar workpiece 602 and an outer edge of the receptacle 604 on one or both sides of the planar workpiece 602; b) a necessity to shake, oscillate, rock side-to-side or otherwise manipulate with force the planar workpiece 602 in order to free it from the receptacle 604 on removal or seat it fully into the receptacle 604 on insertion; c) insertion or removal requires damage or deformation of the planar workpiece 602, "damage or deformation" being defined as an increase or decrease of one or more dimensions of the planar workpiece 602—dimensions being length, width and thickness—of more than 5% of that dimension and/or the tearing, detachment or disassociation of planar workpiece 602 components such as, for example, planar workpiece 602 frame or border from other planar workpiece 602 material. Planar workpiece 602 as used herein refers to a mechanical object shaped as a rectangular cuboid.

A rigid material is required for the first jaw 116 and the second jaw 118, "rigid material" being defined as one that can maintain planarity across its surface to within a deflection from flatness of no more than one-eighth inch along the unsupported edge when a weight of ten pounds is applied to the unsupported edge of a 4 inch by 4 inch piece of this rigid material secured in a horizontal position such that a 2 by 4 inch dimension of this piece is cantilevered and thus unsupported. This measurement can be done by clamping to a flat-topped table one half of a 4 inch by 4 inch piece of the rigid material being tested so that the other half of the test material (a 2 inch by 4 inch section) is off the table top and thus unsupported. Then a ten pound weight is applied to the unsupported edge of the test material (farthest from the table edge) and the deflection of the weighted edge is measured with respect to the table edge.

C. Operation of the First Further Embodiment

Figure 14:
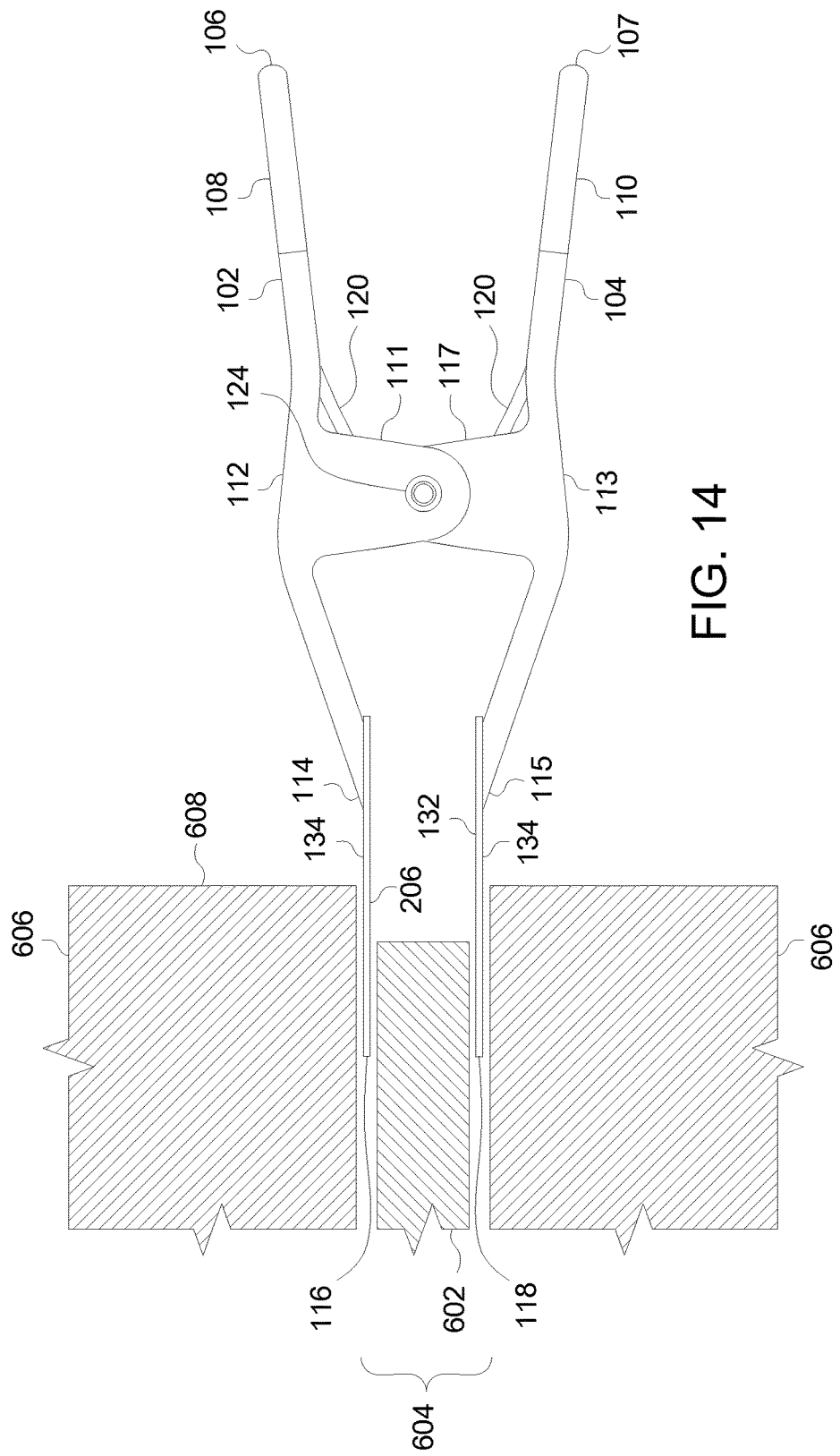
FIG. 14. is a side sectional view of a further embodiment of the present invention in use.

FIG. 14 shows the gripper in operation. In the case of planar workpiece 602 removal, the operator squeezes the first handle 108 and the second handle 110 together to expand the gap between the first jaw 116 and the second jaw 118 until it equals the width of the receptacle 604. The operator then inserts the first jaw 116 and the second jaw 118 into the receptacle 604 so that first gripping surface 206 and the second gripping surface 132 overlap the planar workpiece 602, then the operator releases the first handle 108 and the second handle 110. The resulting tension applied by the spring 122 and the spring arms 120 presses together the first jaw 116 and the second jaw 118. This pressing together of the first jaw 116 and the second jaw 118 causes gripping of the planar workpiece 602 by the first gripping surface 206 and the second gripping surface 132. Once gripped, the planar workpiece 602 can be manipulated as necessary to free its edges from a receptacle frame 606 present on either side of the planar workpiece 602 and then removed.

Planar workpiece 602 insertion is the opposite of removal. The operator squeezes the first handle 108 and the second handle 110 together to expand the gap between the first jaw 116 and the second jaw 118 until it exceeds the width of the planar workpiece 602. The operator then slides the outer edge of the planar workpiece 602 between the first gripping surface 206 and the second gripping surface 132 and releases the first handle 108 and the second handle 110 so that the tension applied by the spring 122 and the spring arms 120 presses together the first jaw 116 and the second jaw 118. The gripper now firmly holds the planar workpiece 602. The operator then inserts the planar workpiece 602 into the receptacle 604. Once partially inserted in the receptacle 604, the planar workpiece 602 can be manipulated as necessary to slide it fully into the receptacle 604. After full insertion of the planar workpiece 602 into the receptacle 604, the operator squeezes the first handle 108 and the second handle 110 together to expand the gap between the first jaw 116 and the second jaw 118 until it exceeds the width of the planar workpiece 602, then the operator withdraws the gripper from the receptacle 604.

In FIG. 14 the planar workpiece 602 is shown as recessed below a receptacle frame edge 608, which is a common occurrence either because the receptacle 604 is deeper than the planar workpiece 602 or because the planar workpiece 602 has become deformed during use. The planar workpiece 602 can be removed from the receptacle 604 in only one direction because the receptacle frame 606 is closed at the other end of the receptacle 604 (bottom of receptacle 604 is not shown in FIG. 14). This placement of the planar workpiece 602 recessed below (or level with) the receptacle frame edge 608 represents the proper operational location for such a planar workpiece 602.

The components depicted in FIG. 14 including but not limited to the receptacle 604, the receptacle frame 606, and the receptacle frame edge 608 are an example of a mechanical system whose operation requires insertion and removal of a planar workpiece 602 that resides in a receptacle 604 during normal operation. The representation of FIG. 14 is for reference only; other arrangements are possible that utilize a planar workpiece 602 whose insertion and removal may require a specialized tool such as the currently described gripper.

D. Overview of the Second Further Embodiment

Figure 15:
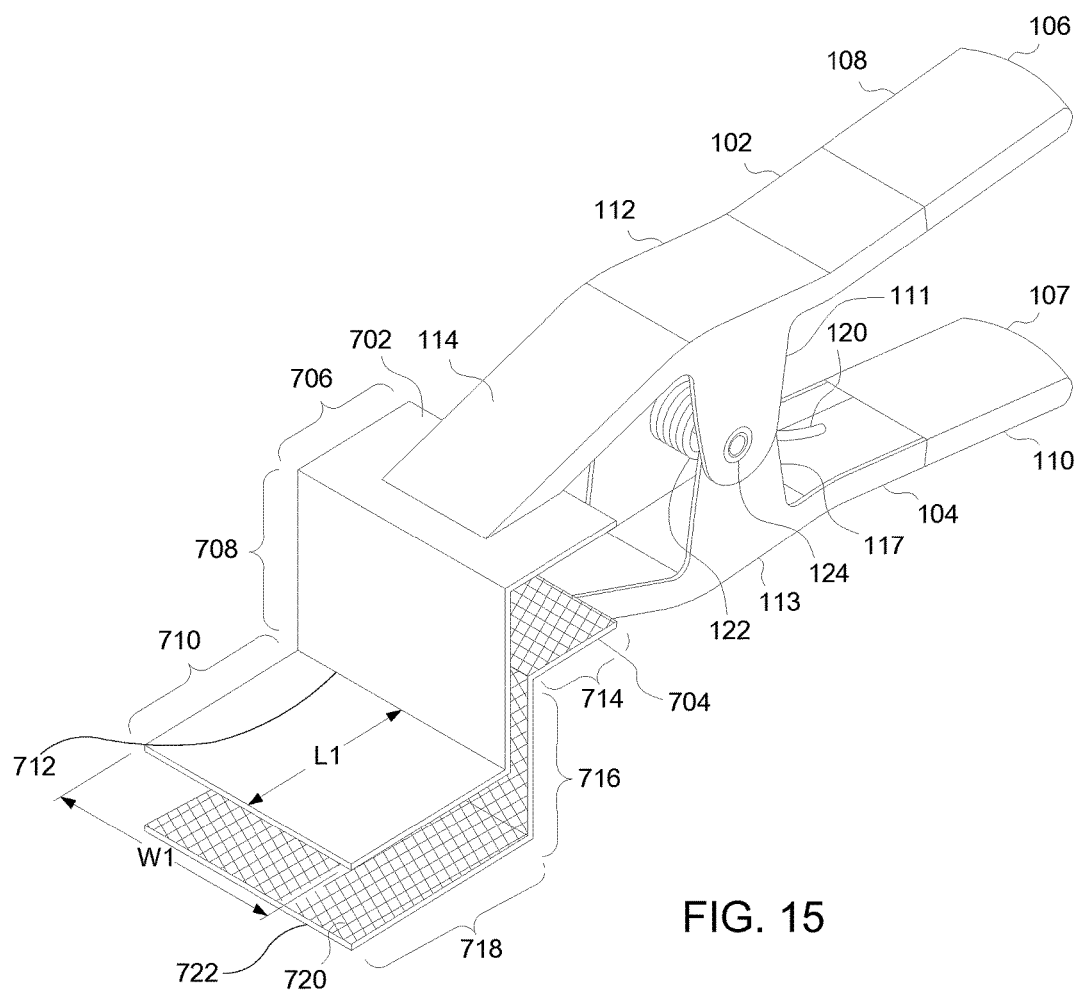
FIG. 15. is a top perspective view of a further embodiment of the present invention.
Figure 16:
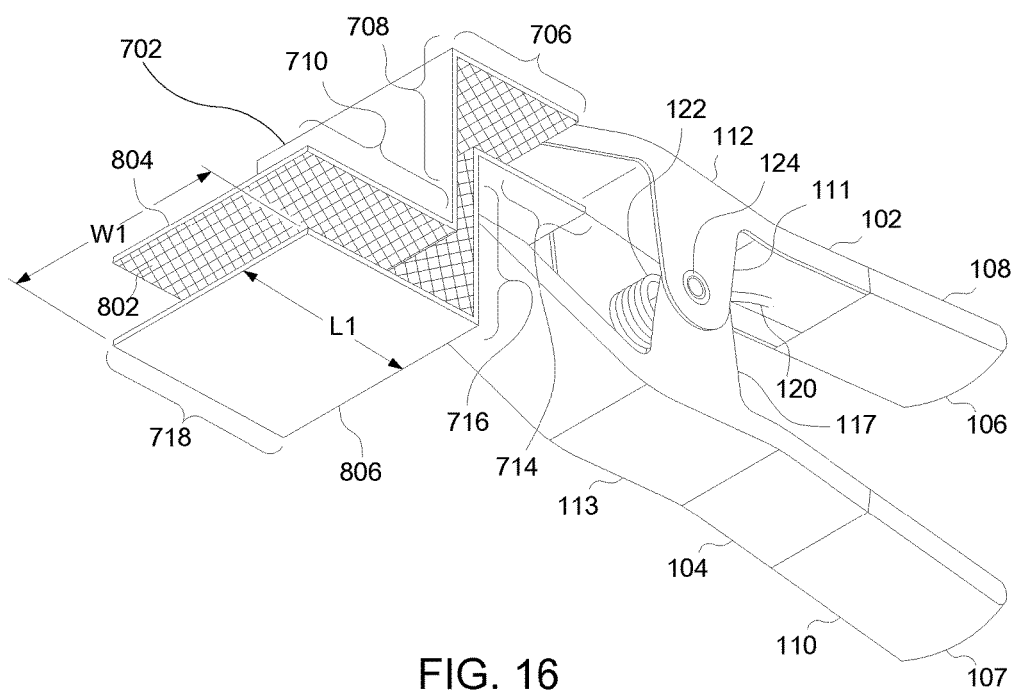
FIG. 16. is a bottom perspective view of a further embodiment of the present invention.

A modification of the gripper first further embodiment depicted in FIGS. 10 through 13 is presented in FIGS. 15 and 16, wherein the gripper has a first offset jaw 702 and a second offset jaw 704 that are step-shaped rather than flat. In this second further embodiment, the first offset jaw 702 adds a first offset jaw top step 706, and a first offset jaw riser 708, while the second offset jaw 704 of this second further embodiment adds a second offset jaw top step 714, and a second offset jaw riser 716. In addition, for this second further embodiment the numbering for certain elements changes as follows:

| Element Name | First Further Embodiment Numeral | Second Further Embodiment Numeral |
|---|---|---|
| first jaw | 116 | 710 |
| second jaw | 118 | 718 |
| first gripping surface | 206 | 802 |
| second gripping surface | 132 | 720 |
| first jaw insertion limit line | 119 | 712 |
| first jaw leading edge | 121 | 804 |
| second jaw insertion limit line | 204 | 806 |
| second jaw leading edge | 136 | 722 |

With the exception of these aforesaid jaw and gripping surface elements, the gripper first further embodiment of FIGS. 10 through 13 and the gripper second further embodiment of FIGS. 15 and 16 are identical. As such this section will describe only the step-shaped offset jaws of this second further embodiment, their orientation, their attachment, and their operation, and the earlier description of all gripper components other than the jaws and gripping surfaces applies equally to this second further embodiment.

E. Detailed Description of a Second Further Embodiment

As depicted in FIGS. 15 and 16, the first offset jaw 702 comprises three planar surfaces connected to form the equivalent of two horizontal and parallel but non-overlapping steps that are attached to one another by a connecting vertical riser. A first offset jaw top step 706 forms the first such planar surface. The longitudinal axis of the first offset jaw top step 706 is oriented parallel to the longitudinal axis of the gripper and is attached to the underside of the first jaw end 114. A first offset jaw riser 708 forms the second such planar surface. The first offset jaw riser 708 is attached to the edge of the first offset jaw top step 706 opposite the first jaw end 114 and is oriented at a right angle to the first offset jaw top step 706 so as to form a downward-oriented riser component in relation to the first offset jaw top step 706. A first jaw 710 forms the third such planar surface. The first jaw 710 is attached to the bottom edge of the first offset jaw riser 708 and extends parallel to the longitudinal axis of the first handle 108 from the first offset jaw riser 708 in a direction opposite from the direction of the first arm 102 and laterally to either side so that the first jaw 710 forms a flat plate of uniform thickness. In this context the phrase "longitudinal axis of the first handle 108" refers to a straight line drawn from substantially the lateral center of the first handle end 106 to substantially the lateral center of the first middle portion 112, this line running parallel to the centerline of the first arm 102, and "uniform" means a thickness variation across the plate surface of no more than approximately 10%. The edge of the first jaw 710 farthest from the first offset jaw riser 708 is the first jaw leading edge 804. The first jaw insertion limit line 712 is the endpoint for insertion of the first jaw 710 into the receptacle 604. For the second further embodiment the first jaw insertion limit line 712 is the attachment point of the first jaw 710 to the first offset jaw riser 708. The insertion distance into the receptacle 604 of the first jaw 710 is the distance from the first jaw leading edge 804 (visible in FIG. 16 but not in FIG. 15) to the first jaw insertion limit line 712, this insertion distance being represented in FIG. 15 by the designation L1. A first gripping surface 802 (visible in FIG. 16 but not in FIG. 15) is located on the underside of the first jaw 710. The two steps and riser of the first offset jaw 702 may be a unitary structure.

Continuing with FIGS. 15 and 16, the second offset jaw 704 comprises three planar surfaces connected to form two horizontal and parallel but non-overlapping steps that are attached to one another by a connecting vertical riser to form a unitary structure. A second offset jaw top step 714 forms the first such planar surface. The longitudinal axis of the second offset jaw top step 714 is oriented parallel to the longitudinal axis of the gripper and is attached to the underside of the second jaw end 115. A second offset jaw riser 716 forms the second such planar surface. The second offset jaw riser 716 is attached to the edge of the second offset jaw top step 714 opposite the second jaw end 115 and is oriented at a right angle to the second offset jaw top step 714 so as to form a downward-oriented riser component in relation to the second offset jaw top step 714. A second jaw 718 forms the third such planar surface. The second jaw 718 is attached to the bottom edge of the second offset jaw riser 716 and extends parallel to the longitudinal axis of the second handle 110 from the second offset jaw riser 716 in a direction opposite from the direction of the second arm 104 and laterally to either side so that the second jaw 718 forms a flat plate of uniform thickness. In this context the phrase "longitudinal axis of the second handle 110" refers to a straight line drawn from substantially the lateral center of the second handle end 107 to substantially the lateral center of the second middle portion 113, this line running parallel to the centerline of the second arm 104, and "uniform" means a thickness variation across the plate surface of no more than approximately 10%. The edge of the second jaw 718 farthest from the second offset jaw riser 716 is the second jaw leading edge 722. The second jaw insertion limit line 806 is the endpoint for insertion of the second jaw 718 into the receptacle 604. For the second further embodiment the second jaw insertion limit line 806 is the attachment point of the second jaw 718 to the second offset jaw riser 716. The insertion distance into the receptacle 604 of the second jaw 718 is the distance from the second jaw leading edge 722 (visible in FIG. 15 but not in FIG. 16) to the second jaw insertion limit line 806, this insertion distance being represented in FIG. 16 by the designation L1. A second gripping surface 720 (visible in FIG. 15 but not in FIG. 16) is located on the top side of the second jaw 718. The two steps and riser of the second offset jaw 704 may be a unitary structure.

As depicted in FIGS. 15 and 16, the first jaw 710 and the second jaw 718 overlap one another. The first offset jaw 702 has an outer surface 134 and a first gripping surface 802, and the second offset jaw 704 has an outer surface 134 and a second gripping surface 720. The first gripping surface 802 and the second gripping surface 720 face one another and, in this embodiment, have coincident edges when viewed from a point six inches along an axis perpendicular to the plane of the first gripping surface 802 that extends outward from the first jaw 710 center point. The first gripping surface 802 and the second gripping surface 720 are substantially parallel to one another and, for the HVAC filter manipulation application discussed earlier, have an adjustable gap of approximately one inch between the first gripping surface 802 and the second gripping surface 720. Other embodiments for different applications may have different jaw dimensions, jaw overlap, and gripping surface gap.

The dimensions and material of manufacture for the first offset jaw 702 and the second offset jaw 704 can vary based on gripper application. For the application involving manipulation of HVAC filters discussed earlier, the width W1 of the first jaw 710, shown in FIGS. 15 and 16, may be two inches and the insertion distance L1 may be two inches or more. For the same HVAC filter manipulation application the width W1 of the second jaw 718, as illustrated in FIGS. 15 and 16, may be two inches and the insertion distance L1 may be two inches or more. These first jaw 710 and second jaw 718 insertion distance and width dimensions will need to be substantially at least 1.25 inches to ensure sufficient gripping surface and depth of insertion into the receptacle 604, the term "substantially at least 1.25 inches" meaning no less than 1.125 inches. One possible first offset jaw 702 and second offset jaw 704 material of manufacture in this HVAC filter manipulation application is 16 gauge cold-rolled steel (0.0598 inches thick). For applications using cold-rolled steel jaws as a material of manufacture, an anti-corrosion coating such as, but not limited to, zinc or paint may be applied. Other embodiments for this HVAC filter or different applications may use stainless steel, plastic, carbon fiber or other materials for jaws.

Figure 17:
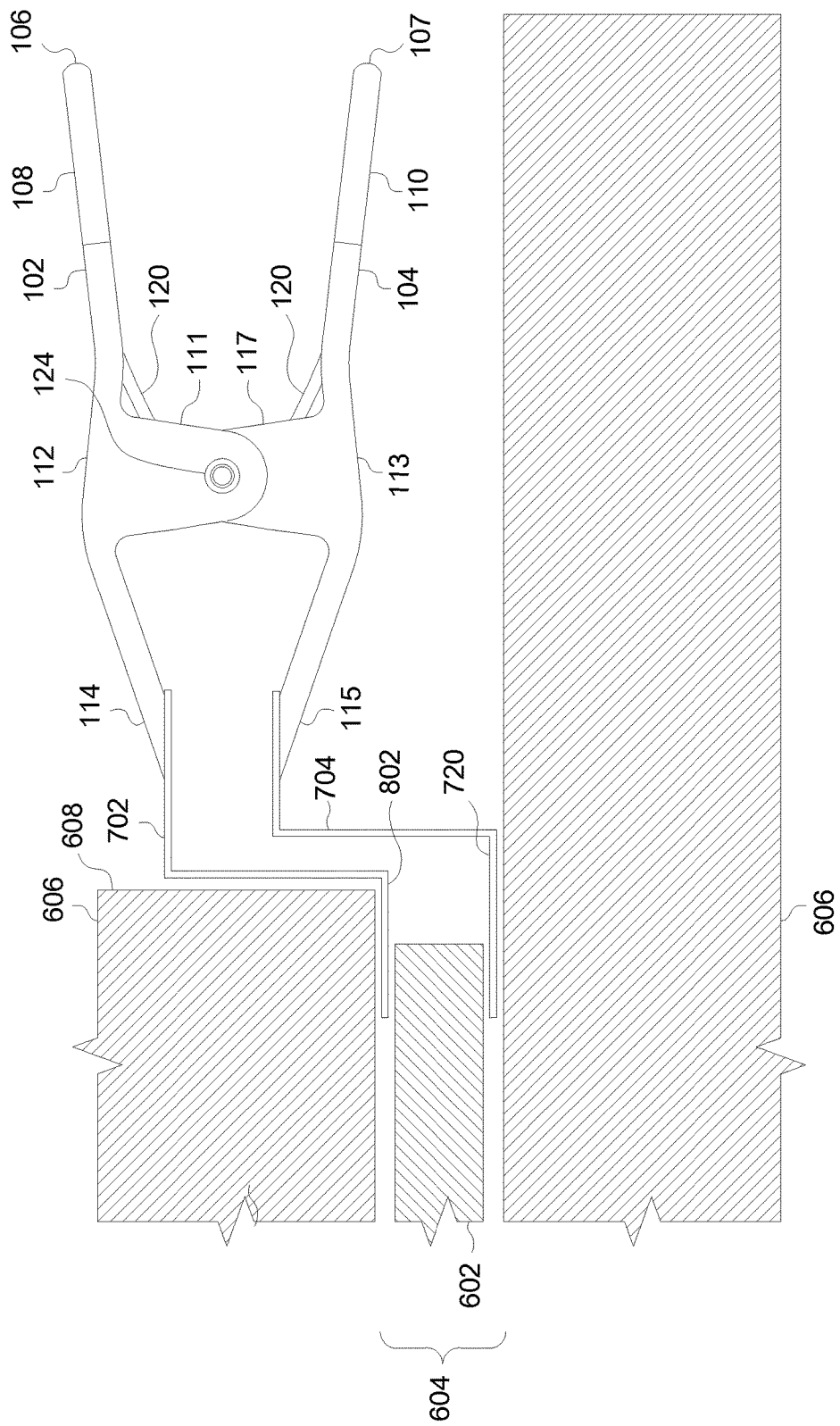
FIG. 17. is a side sectional view of a further embodiment of the present invention in use.

As illustrated in FIG. 17, this second further embodiment of the gripper is used when the receptacle frame 606 on one side of the receptacle 604 extends in the direction of insertion and removal of the planar workpiece 602 such that insertion of the gripper with flat jaws (FIGS. 10 through 13) into the receptacle 604 is difficult or not possible.

Though the first offset jaw top step 706, the first offset jaw riser 708, and the first jaw 710 are shown as unitary structures in the referenced figures, they may be shaped or attached to one another and the first jaw end 114 differently in other embodiments and their representation herein should not be considered a limitation. Similarly, though second offset jaw top step 714, the second offset jaw riser 716, and the second jaw 718 are shown as unitary structures in the referenced figures, they may be shaped or attached to one another and the second jaw end 115 differently in other embodiments and their representation herein should not be considered a limitation.

The thickness of the first jaw 710 and the second jaw 718 material must be less than approximately 0.075 inches, meaning that the thickness cannot exceed 0.080 inches. This minimal jaw thickness permits use of the gripper when planar workpiece 602 fits tightly or is stuck in its receptacle 604, "fits tightly", "stuck in", and "fit tightly" being defined as one or more of the following conditions: a) less than approximately 0.25 inches of space between an outer edge of the planar workpiece 602 and an outer edge of the receptacle 604 on one or both sides of the planar workpiece 602; b) a necessity to shake, oscillate, rock side-to-side or otherwise manipulate with force the planar workpiece 602 in order to free it from the receptacle 604 on removal or seat it fully into the receptacle 604 on insertion; c) insertion or removal requires damage or deformation of the planar workpiece 602, "damage or deformation" being defined as an increase or decrease of one or more dimensions of the planar workpiece 602—dimensions being length, width and depth—of more than 5% of that dimension and/or the tearing, detachment or disassociation of planar workpiece 602 components such as, for example, planar workpiece 602 frame or border from other planar workpiece 602 material. Planar workpiece 602 as used herein refers to a mechanical object shaped as a rectangular cuboid.

A rigid material is required for the first jaw 710 and the second jaw 718, "rigid material" being defined as one that can maintain planarity across its surface to within a deflection from flatness of no more than one-eighth inch along the unsupported edge when a weight of ten pounds is applied to the unsupported edge of a 4 inch by 4 inch piece of this rigid material secured in a horizontal position such that a 2 by 4 inch dimension of this piece is cantilevered and thus unsupported. This measurement can be done by clamping to a flat-topped table one half of a 4 inch by 4 inch piece of the rigid material being tested so that the other half of the test material (a 2 inch by 4 inch section) is off the table top and thus unsupported. Then a ten pound weight is applied to the unsupported edge of the test material (farthest from the table edge) and the deflection of the weighted edge is measured with respect to the table edge.

F. Operation of a Second Further Embodiment

The second further embodiment of the gripper presented in FIG. 17 operates similarly to the flat jaw gripper of FIGS. 10 through 13. In the case of planar workpiece 602 removal, the operator squeezes the first handle 108 and the second handle 110 together to expand the gap between the first jaw 710 and the second jaw 718 until it equals the width of the receptacle 604. The operator then inserts the first jaw 710 and the second jaw 718 into the receptacle 604 so that the first gripping surface 802 and the second gripping surface 720 overlap the planar workpiece 602, then the operator releases the first handle 108 and the second handle 110. The resulting tension applied by the spring 122 and the spring arms 120 presses together the first jaw 710 and the second jaw 718. This pressing together of the first jaw 710 and the second jaw 718 causes gripping of the planar workpiece 602 by the first gripping surface 802 and the second gripping surface 720. Once gripped, the planar workpiece 602 can be manipulated as necessary to free its edges from a receptacle frame 606 present on either side of the planar workpiece 602 and then removed.

Planar workpiece 602 insertion using the offset jaw embodiment of the gripper as depicted in FIG. 17 is the opposite of removal. The operator squeezes the first handle 108 and the second handle 110 together to expand the gap between the first jaw 710 and the second jaw 718 until it exceeds the width of the planar workpiece 602. The operator then slides the outer edge of the planar workpiece 602 between the first gripping surface 802 and the second gripping surface 720 and releases the first handle 108 and the second handle 110 so that the tension applied by the spring 122 and the spring arms 120 presses together the first jaw 710 and the second jaw 718. The gripper now firmly holds the planar workpiece 602. The operator then inserts the planar workpiece 602 into the receptacle 604. Once partially inserted in the receptacle 604, the planar workpiece 602 can be manipulated as necessary to slide it fully into the receptacle 604. After full insertion of the planar workpiece 602 into the receptacle 604, the operator squeezes the first handle 108 and the second handle 110 together to expand the gap between the first jaw 710 and the second jaw 718 until it exceeds the width of the planar workpiece 602, then the operator withdraws the gripper from the receptacle 604 leaving the planar workpiece 602 in place.

In FIG. 17 the planar workpiece 602 is shown as recessed below a receptacle frame edge 608, which is a common occurrence either because the receptacle 604 is deeper than the planar workpiece 602 or because the planar workpiece 602 has become deformed during use. The planar workpiece 602 can be removed from the receptacle 604 in only one direction because the receptacle frame 606 is closed at the other end of the receptacle 604 (bottom of receptacle 604 is not shown in FIG. 17). This placement of the planar workpiece recessed below (or level with) the receptacle frame edge represents the proper operational location for such a planar workpiece.

The components depicted in FIG. 17 including but not limited to the receptacle 604, the receptacle frame 606, and the receptacle frame edge 608 are an example of a mechanical system whose operation requires insertion and removal of a planar workpiece 602 that resides in a receptacle 604 during normal operation. The representation of FIG. 17 is for reference only; other arrangements are possible that utilize a planar workpiece 602 whose insertion and removal may require a specialized tool such as the currently described gripper.

The invention claimed is:

1. A gripper for manipulating a planar workpiece (602) in a receptacle (604), the gripper comprising:
   (a) a first arm (102) having a first handle (108), and a second arm (104) having a second handle (110), said arms (102), (104) being connected pivotally such that they operate in a tong-like fashion when the first handle (108) and the second handle (110) are actuated;
   (b) a first jaw (116, 710) of rigid material and predetermined uniform thickness that attaches to a first jaw end (114) of said first arm (102) located opposite said first handle (108), said first jaw (116, 710) extending longitudinally as a flat surface from a first jaw leading edge (121) located opposite said first jaw end (114) in a direction toward said first jaw end (114) to a first jaw insertion limit line (119) at which said first jaw (116, 710) attaches to said first jaw end (114), and said first jaw (116, 710) extending as a flat surface laterally a width that is substantially at least 1.25 inches;
   (c) a second jaw (118, 718) of rigid material and predetermined uniform thickness that attaches to a second jaw end (115) of said second arm (104) located opposite said second handle (110), said second jaw (118, 718) extending longitudinally as a flat surface from a second jaw leading edge (136) located opposite said second jaw end (115) in a direction toward said second jaw end (115) to a second jaw insertion limit line (204) at which said second jaw (118, 718) attaches to said second jaw end (115), and said second jaw (118, 718) extending as a flat surface laterally a width that is substantially at least 1.25 inches;
   (d) a spring (122) and spring arms (120) that bias said gripper to the normally closed position as the result of said spring arms (120) exerting pressure on said first arm (102) and said second arm (104);
   (e) a first gripping surface (206, 802) comprising that surface of said first jaw (116) located opposite said first jaw's (116) attachment point to said first jaw end (114), and a second gripping surface (132, 720) comprising that surface of said second jaw (118) located opposite said second jaw's (118) attachment point to said second jaw end (115), said first gripping surface (206, 802) and said second gripping surface (132, 720) together acting to grip said planar workpiece (602) when pressed against said planar workpiece (602) by said spring (122) exerting pressure on said first arm (102) and said second arm (104);
   (f) an arrangement of said first gripping surface (206, 802) and said second gripping surface (132, 720) such that these surfaces face one another directly and are substantially parallel to one another when separated by a gap approximately equal to the thickness of said planar workpiece (602);
   whereby said first jaw (116, 710) and said second jaw (118, 718) can be inserted into said receptacle (604) with one jaw on each side of said planar workpiece (602), the insertion distance into said receptacle (604) being substantially parallel to the longitudinal axis of said first handle (108) and said second handle (110), and extending from each jaw's leading edge to each jaw's jaw insertion limit line.

2. The gripper of claim 1, wherein:
(a) said first jaw (116) is less than approximately 0.075 inches thick and attaches directly to and extends longitudinally from said first jaw end (114) in a direction away from said first handle (108) a distance that is substantially at least 1.25 inches;
(b) said second jaw (118) is less than approximately 0.075 inches thick and attaches directly to and extends longitudinally from said second jaw end (115) in a direction away from said second handle (110) a distance that is substantially at least 1.25 inches;
(c) said first jaw (116) and said second jaw (118) are arranged so that both jaws can be inserted into a receptacle (604) a distance that is substantially at least 1.25 inches with one jaw on each side of said planar workpiece (602);
(d) said planar workpiece (602) is substantially at least 0.50 inches thick;
whereby said gripper enables insertion or removal of said planar workpiece (602) without damage or deformation when the proper operational location for said planar workpiece (602) is recessed below or level with a receptacle frame edge (608) of said receptacle (604), and said planar workpiece (602) may fit tightly or be stuck in said receptacle (604).

3. The gripper of claim 1, wherein:
(a) said first jaw (710) attaches at a right angle to a first offset jaw riser (708) at said first jaw insertion limit line (712) and extends longitudinally from said first jaw leading edge (804) to said first jaw insertion limit line (712) a distance that is substantially at least 1.25 inches, and said first jaw (710) extends laterally to either side of said first arm (102);
(b) said first offset jaw riser (708) attaches at a right angle to a first offset jaw top step (706);
(c) said first offset jaw top step (706) attaches directly to said first jaw end (114) of said first arm (102);
(d) said first jaw (710), said first offset jaw riser (708), and said first offset jaw top step (706) together form a first offset jaw (702), said first offset jaw being a unitary element having three flat surfaces with the plane of said first offset jaw top step (706) being parallel to the plane of said first jaw (710);
(e) said first jaw (710) is less than approximately 0.075 inches thick;
(f) said second jaw (718) attaches at a right angle to a second offset jaw riser (716) at said second jaw insertion limit line (806) and extends longitudinally from said second jaw leading edge (722) to said second jaw insertion limit line (806) a distance that is substantially at least 1.25 inches, and said second jaw (718) extends laterally to either side of said second arm (104);
(g) said second offset jaw riser (716) attaches at a right angle to a second offset jaw top step (714);
(h) said second offset jaw top step (714) attaches directly to said second jaw end (115) of said second arm (104);
(i) said second jaw (718), said second offset jaw riser (716), and said second offset jaw top step (714) together form a second offset jaw (704), said second offset jaw (702) being a unitary element having three flat surfaces with the plane of said second offset jaw top step (714) being parallel to the plane of said second jaw (718);
(j) said second jaw (718) is less than approximately 0.075 inches thick;
(k) said first jaw (710) and said second jaw (718) are arranged so that both jaws can be inserted into a receptacle (604) a distance that is substantially at least 1.25 inches with one jaw on each side of said planar workpiece (602);
(l) said planar workpiece (602) is substantially at least 0.50 inches thick;
whereby said gripper enables insertion or removal of said planar workpiece (602) without damage or deformation when the proper operational location for said planar workpiece (602) is recessed below or level with a receptacle frame edge (608) of said receptacle (604), and said planar workpiece (602) may fit tightly or be stuck in said receptacle (604).

4. A planar workpiece manipulation system comprising:
(a) a planar workpiece (602) that resides in a receptacle (604) when in operation, and whose use requires installation and removal by a human;
(b) a mechanical system containing said receptacle (604) populated by said planar workpiece (602);
(c) a gripper comprising a first arm (102) having a first handle (108), a second arm (104) having a second handle (110), said arms (102), (104) being connected pivotally such that they operate in a tong-like fashion when the first handle (108) and the second handle (110) are actuated;
(d) said gripper having a first jaw (116, 710) of rigid material and predetermined uniform thickness that attaches to a first jaw end (114) of said first arm (102) located opposite said first handle (108), said first jaw (116, 710) extending longitudinally as a flat surface from a first jaw leading edge (121) located opposite said first jaw end (114) in a direction toward said first jaw end (114) to a first jaw insertion limit line (119) at which said first jaw (116) attaches to said first jaw end (114), and said first jaw (116, 710) extending as a flat surface laterally a width that is substantially at least 1.25 inches;
(e) said gripper having a second jaw (118, 718) of rigid material and predetermined uniform thickness that attaches to a second jaw end (115) of said second arm (104) located opposite said second handle (110), said second jaw (118, 718) extending longitudinally as a flat surface from a second jaw leading edge (136) located opposite said second jaw end (115) in a direction toward said second jaw end (115) to a second jaw insertion limit line (204) at which said second jaw (118, 718) attaches to said second jaw end (115), and said second jaw (118, 718) extending as a flat surface laterally a width that is substantially at least 1.25 inches;
(f) said gripper having a spring (122) and spring arms (120) that bias said gripper to the normally closed position as the result of said spring arms (120) exerting pressure on said first arm (102) and said second arm (104);
(g) said gripper having a first gripping surface (206, 802) comprising that surface of said first jaw (116) located opposite said first jaw's (116) attachment point to said first jaw end (114), and a second gripping surface (132, 720) comprising that surface of said second jaw (118) located opposite said second jaw's (118) attachment point to said second jaw end (115), said first gripping surface (206, 802) and said second gripping surface (132, 720) together acting to grip a planar workpiece (602) when pressed against said planar workpiece (602) by said spring (122) exerting pressure on said first arm (102) and said second arm (104);

(h) said gripper having an arrangement of said first gripping surface (206, 802) and said second gripping surface (132, 720) such that these surfaces face one another directly and are substantially parallel to one another when separated by a gap approximately equal to the thickness of the planar workpiece (602);

whereby said gripper's first jaw (116) and second jaw (118) can be inserted into said receptacle (604) with one jaw on each side of said planar workpiece (602), the insertion distance into said receptacle (604) being substantially parallel to the longitudinal axis of said first handle (108) and said second handle (110), and extending from each jaw's leading edge to each jaw's jaw insertion limit line.

5. The planar workpiece manipulation system of claim 4, wherein:
    (a) said first jaw (116) is less than approximately 0.075 inches thick and attaches directly to and extends longitudinally from said first jaw end (114) in a direction away from said first handle (108) a distance that is substantially at least 1.25 inches;
    (b) said second jaw (118) is less than approximately 0.075 inches thick and attaches directly to and extends longitudinally from said second jaw end (115) in a direction away from said second handle (110) a distance that is substantially at least 1.25 inches;
    (c) said first jaw (116) and said second jaw (118) are arranged so that both jaws can be inserted into a receptacle (604) a distance that is substantially at least 1.25 inches with one jaw on each side of said planar workpiece (602);
    (d) said planar workpiece (602) is substantially at least 0.50 inches thick;
    whereby said planar workpiece manipulation system enables insertion or removal of said planar workpiece (602) without damage or deformation when the proper operational location for said planar workpiece (602) is recessed below or level with a receptacle frame edge (608) of said receptacle (604), and said planar workpiece (602) may fit tightly or be stuck in said receptacle (604).

6. The planar workpiece manipulation system of claim 4, wherein:
    (a) said first jaw (710) attaches at a right angle to a first offset jaw riser (708) at said first jaw insertion limit line (712) and extends longitudinally from said first jaw leading edge (804) to said first jaw insertion limit line (712) a distance that is substantially at least 1.25 inches, and said first jaw (710) extends laterally to either side of said first arm (102);
    (b) said first offset jaw riser (708) attaches at a right angle to a first offset jaw top step (706);
    (c) said first offset jaw top step (706) attaches directly to said first jaw end (114) of said first arm (102);
    (d) said first jaw (710), said first offset jaw riser (708), and said first offset jaw top step (706) together form a first offset jaw (702), said first offset jaw being a unitary element having three flat surfaces with the plane of said first offset jaw top step (706) being parallel to the plane of said first jaw (710);
    (e) said first jaw (710) is less than approximately 0.075 inches thick;
    (f) said second jaw (718) attaches at a right angle to a second offset jaw riser (716) at said second jaw insertion limit line (806) and extends longitudinally from said second jaw leading edge (722) to said second jaw insertion limit line (806) a distance that is substantially at least 1.25 inches, and said second jaw (718) extends laterally to either side of said second arm (104);
    (g) said second offset jaw riser (716) attaches at a right angle to a second offset jaw top step (714);
    (h) said second offset jaw top step (714) attaches directly to said second jaw end (115) of said second arm (104);
    (i) said second jaw (718), said second offset jaw riser (716), and said second offset jaw top step (714) together form a second offset jaw (704), said second offset jaw (702) being a unitary element having three flat surfaces with the plane of said second offset jaw top step (714) being parallel to the plane of said second jaw (718);
    (j) said second jaw (718) is less than approximately 0.075 inches thick;
    (k) said first jaw (710) and said second jaw (718) are arranged so that both jaws can be inserted into a receptacle (604) a distance that is substantially at least 1.25 inches with one jaw on each side of said planar workpiece (602)
    (l) said planar workpiece (602) is substantially at least 0.50 inches thick;
    whereby said planar workpiece manipulation system enables insertion or removal of said planar workpiece (602) without damage or deformation when the proper operational location for said planar workpiece (602) is recessed below or level with a receptacle frame edge (608) of said receptacle (604), and said planar workpiece (602) may fit tightly or be stuck in said receptacle (604).

* * * * *